US012386860B1

(12) United States Patent
Rose et al.

(10) Patent No.: US 12,386,860 B1
(45) Date of Patent: Aug. 12, 2025

(54) MULTI-DIMENSIONAL EVALUATIONS FOR THE CLASSIFICATION OF DATA OBJECTS

(71) Applicant: Optum, Inc., Minnetonka, MN (US)

(72) Inventors: Lisa Dianne Rose, Godfrey, IL (US); Michael J. DeTolla, Bainbridge Island, WA (US); Kelly Kay Romsdahl, Lakeville, MN (US); Tanya A. Hendrickson, North Kingstown, RI (US); Nancy E. Morden, Edina, MN (US)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 17/511,370

(22) Filed: Oct. 26, 2021

Related U.S. Application Data

(60) Provisional application No. 63/158,181, filed on Mar. 8, 2021, provisional application No. 63/106,425, filed on Oct. 28, 2020.

(51) Int. Cl.

| | |
|---|---|
| ***G06F 16/54*** | (2019.01) |
| ***G06F 9/54*** | (2006.01) |
| ***G06F 16/22*** | (2019.01) |
| ***G06F 16/28*** | (2019.01) |
| ***G06F 16/903*** | (2019.01) |

(52) U.S. Cl.
CPC .............. *G06F 16/285* (2019.01); *G06F 9/54* (2013.01); *G06F 16/2264* (2019.01); *G06F 16/2282* (2019.01); *G06F 16/90344* (2019.01)

(58) Field of Classification Search
None
See application file for complete search history.

(56) References Cited

U.S. PATENT DOCUMENTS

| | | | |
|---|---|---|---|
| 7,640,175 | B1 | 12/2009 | Prasad et al. |
| 8,744,870 | B2 | 6/2014 | Shastri et al. |
| 10,417,382 | B1 | 9/2019 | Detolla et al. |

(Continued)

OTHER PUBLICATIONS

Divya S; A Self-Diagnosis Medical Chatbot Using Artificial Intelligence; MAT; 2018; pp. 1-7 (Year: 2018).*
Gong Cheng; Multi-class geospatial object detection and geographic image classification based on collection of part detectors ISPRS Journal of Photogrammetry and Remote Sensing; 2014; pp. 119-132 (Year: 2014).*

(Continued)

*Primary Examiner* — Ann J Lo
*Assistant Examiner* — Jermaine A Mincey
(74) *Attorney, Agent, or Firm* — ALSTON & BIRD LLP

(57) ABSTRACT

Various embodiments of the present disclosure provide methods, apparatuses, systems, devices, computing entities for evaluating a medical encounter between a healthcare provider and a patient. Various embodiments evaluate a medical encounter to determine a classification of the medical encounter. An example method comprises receiving a claim data object comprising a plurality of code portions, each code portion corresponding to a dimension of the medical encounter; processing the claim data object to extract a plurality of code character strings, each code character string extracted from a corresponding code portion of the claim data object; generating a claim classification for the claim data object based at least in part on evaluating the plurality of code character strings with respect to at least one dimension relating to the provider's contribution to the encounter and at least one dimension relating to the patient's contribution to the encounter; and performing at least one classification-based action.

20 Claims, 18 Drawing Sheets

(56) References Cited

U.S. PATENT DOCUMENTS

| | | | | |
|---|---|---|---|---|
| 2004/0143403 | A1* | 7/2004 | Brandon | G16B 25/10 702/19 |
| 2012/0197876 | A1* | 8/2012 | Morris | G16H 10/60 707/723 |
| 2013/0035959 | A1 | 2/2013 | Clickner et al. | |
| 2013/0073306 | A1 | 3/2013 | Shlain et al. | |
| 2014/0067424 | A1 | 3/2014 | Ramakrishnan et al. | |
| 2016/0055310 | A1 | 2/2016 | Bentley et al. | |
| 2017/0169181 | A1 | 6/2017 | Shumer et al. | |
| 2018/0308003 | A1* | 10/2018 | Singh | G06N 20/00 |
| 2020/0243172 | A1* | 7/2020 | Brady | G06F 16/90344 |
| 2021/0249137 | A1* | 8/2021 | Dil Nahlieli | G16H 10/60 |
| 2021/0287069 | A1* | 9/2021 | Mumcuyan | G06N 3/045 |
| 2021/0390414 | A1* | 12/2021 | Schneider | G06F 18/217 |

OTHER PUBLICATIONS

Jennifer P. Craig; The Ocular Surface; Elsevier; 2017; p. 277-283.*

Johnston, Kenton J. et al. "A 'Patch' To The NYU Emergency Department Visit Algorithm," Health Service Research, Aug. 2017 (ePub: Jul. 9, 2017), vol. 52, No. 4, pp. 1264-1276, DOI: 10.1111/1475-6773.12638.

Lemke, Klaus W. et al. "A Revised Classification Algorithm For Assessing Emergency Department Visit Severity Of Populations," The American Journal of Managed Care, vol. 26, No. 3, Mar. 10, 2020, pp. 119-125.

Lowe, Robert A. "Updating The Emergency Department Algorithm: One Patch Is Not Enough," Health Services Research, Aug. 2017, vol. 52, No. 4, pp. 1257-1263, DOI: 10.1111/1475-6773.12735.

* cited by examiner

1200

| Code | Description |
|---|---|
| S0041 | Abrasion of ear |
| S00412 | Abrasion of left ear |
| S00412A | Abrasion of left ear, initial encounter |
| S00412S | Abrasion of left ear, sequela |
| S00412D | Abrasion of left ear, subsequent encounter |
| S00511 | Abrasion of lip |
| S0051 | Abrasion of lip and oral cavity |
| S00511A | Abrasion of lip, initial encounter |
| S00511S | Abrasion of lip, sequela |
| S00511D | Abrasion of lip, subsequent encounter |
| S0031 | Abrasion of nose |

| | |
|---|---|
| T7849XA | Other allergy, initial encounter |
| T7849XS | Other allergy, sequela |
| T7849XD | Other allergy, subsequent encounter |
| T784 | Other and unspecified allergy |

1202 1204

| | |
|---|---|
| X503 | Overexertion from repetitive movements |
| X503XXA | Overexertion from repetitive movements, initial encounter |
| X503XXS | Overexertion from repetitive movements, sequela |
| X503XXD | Overexertion from repetitive movements, subsequent encounter |
| X500 | Overexertion from strenuous movement or load |
| X500XXA | Overexertion from strenuous movement or load, initial encounter |

| | |
|---|---|
| Y92831 | Amusement park as the place of occurrence of the external cause |
| Y9203 | Apartment as the place of occurrence of the external cause |
| Y92250 | Art Gallery as the place of occurrence of the external cause |
| Y9231 | Athletic court as the place of occurrence of the external cause |
| Y9232 | Athletic field as the place of occurrence of the external cause |
| Y92510 | Bank as the place of occurrence of the external cause |
| Y9271 | Barn as the place of occurrence of the external cause |
| Y92133 | Barracks on military base as the place of occurrence of the external cause |

| ICDCode | ICD Description |
|---|---|
| A049 | Bacterial intestinal infection, unspecified |
| A059 | Bacterial foodborne intoxication, unspecified |
| A061 | Chronic intestinal amebiasis |
| A062 | Amebic nondysenteric colitis |
| A063 | Ameboma of intestine |
| A067 | Cutaneous amebiasis |
| A0681 | Amebic cystitis |
| A0682 | Other amebic genitourinary infections |
| A0689 | Other amebic infections |
| A069 | Amebiasis, unspecified |
| A242 | Subacute and chronic melioidosis |
| A243 | Other melioidosis |
| A249 | Melioidosis, unspecified |
| A430 | Pulmonary nocardiosis |
| A431 | Cutaneous nocardiosis |
| A438 | Other forms of nocardiosis |
| A439 | Nocardiosis, unspecified |
| A488 | Other specified bacterial diseases |

| CPT | Description |
|---|---|
| 62284 | INJECTION PROCEDURE MYELOGRAPHY/CT LUMBAR |
| 70336 | MRI TEMPOROMANDIBULAR JOINT |
| 70450 | CT HEAD/BRAIN W/O CONTRAST MATERIAL |
| 70460 | CT HEAD/BRAIN W/CONTRAST MATERIAL |
| 70470 | CT HEAD/BRAIN W/O & W/CONTRAST MATERIAL |
| 70480 | CT ORBIT SELLA/POST FOSSA/EAR W/O CONTRAST MATRL |
| 70481 | CT ORBIT SELLA/POST FOSSA/EAR W/CONTRAST MATRL |
| 70482 | CT ORBIT SELLA/POST FOSSA/EAR W/O & W/CONTR MATR |
| 70486 | CT MAXILLOFACIAL W/O CONTRAST MATERIAL |
| 70487 | CT MAXILLOFACIAL W/CONTRAST MATERIAL |
| 70488 | CT MAXILLOFACIAL W/O & W/CONTRAST MATERIAL |
| 70490 | CT SOFT TISSUE NECK W/O CONTRAST MATERIAL |
| 70491 | CT SOFT TISSUE NECK W/CONTRAST MATERIAL |
| 70492 | CT SOFT TISSUE NECK W/O & W/CONTRAST MATERIAL |
| 70496 | CT ANGIOGRAPHY HEAD W/CONTRAST/NONCONTRAST |
| 70498 | CT ANGIOGRAPHY NECK W/CONTRAST/NONCONTRAST |
| 70540 | MRI ORBIT FACE &/NECK W/O CONTRAST |
| 70542 | MRI ORBIT FACE & NECK W/CONTRAST MATERIAL |
| 70543 | MRI ORBIT FACE & NECK W/O & W/CONTRAST MATRL |

| CPT Category | Point Value |
|---|---|
| Lab | 100 |
| Radiology | 100 |
| Advanced | 200 |
| Systemic Therapeutics | 100 |
| EKG | 100 |
| Other | 0 |

| ICDCode | ICDDescr |
|---|---|
| A084 | Viral intestinal infection, unspecified |
| A084 | Viral intestinal infection, unspecified |
| A09 | Infectious gastroenteritis and colitis, unspecified |
| A09 | Infectious gastroenteritis and colitis, unspecified |
| B002 | Herpesviral gingivostomatitis and pharyngotonsillitis |
| B002 | Herpesviral gingivostomatitis and pharyngotonsillitis |
| B301 | Conjunctivitis due to adenovirus |
| B308 | Other viral conjunctivitis |
| B309 | Viral conjunctivitis, unspecified |
| B839 | Helminthiasis, unspecified |
| B888 | Other specified infestations |
| B889 | Infestation, unspecified |
| B998 | Other infectious disease |
| B999 | Unspecified infectious disease |
| D5700 | Hb-SS disease with crisis, unspecified |
| D6481 | Anemia due to antineoplastic chemotherapy |
| D6489 | Other specified anemias |
| D649 | Anemia, unspecified |
| E10641 | Type 1 diabetes mellitus with hypoglycemia with coma |
| E10649 | Type 1 diabetes mellitus with hypoglycemia without coma |
| E11649 | Type 2 diabetes mellitus with hypoglycemia without coma |
| E1165 | Type 2 diabetes mellitus with hyperglycemia |
| E160 | Drug-induced hypoglycemia without coma |
| E161 | Other hypoglycemia |
| E162 | Hypoglycemia, unspecified |
| E46 | Unspecified protein-calorie malnutrition |
| E46 | Unspecified protein-calorie malnutrition |
| E860 | Dehydration |
| E860 | Dehydration |
| E860 | Dehydration |
| E875 | Hyperkalemia |
| E876 | Hypokalemia |
| F19939 | Other psychoactive substance use, unsp with withdrawal, unsp |

| Code | Description |
| --- | --- |
| A200 | Bubonic plague |
| A201 | Cellulocutaneous plague |
| A202 | Pneumonic plague |
| A203 | Plague meningitis |
| A207 | Septicemic plague |
| A208 | Other forms of plague |
| A209 | Plague, unspecified |
| F0151 | Vascular dementia with behavioral disturbance |
| F0281 | Dementia in oth diseases classd elswhr w behavioral disturb |
| F0391 | Unspecified dementia with behavioral disturbance |
| F04 | Amnestic disorder due to known physiological condition |
| F05 | Delirium due to known physiological condition |
| F060 | Psychotic disorder w hallucin due to known physiol condition |
| F061 | Catatonic disorder due to known physiological condition |
| F062 | Psychotic disorder w delusions due to known physiol cond |
| F10120 | Alcohol abuse with intoxication, uncomplicated |
| F10121 | Alcohol abuse with intoxication delirium |
| F10129 | Alcohol abuse with intoxication, unspecified |
| F1014 | Alcohol abuse with alcohol-induced mood disorder |
| F10150 | Alcohol abuse w alcoh-induce psychotic disorder w delusions |
| F10151 | Alcohol abuse w alcoh-induce psychotic disorder w hallucin |
| F10159 | Alcohol abuse with alcohol-induced psychotic disorder, unsp |
| F10180 | Alcohol abuse with alcohol-induced anxiety disorder |
| F10181 | Alcohol abuse with alcohol-induced sexual dysfunction |

MULTI-DIMENSIONAL EVALUATIONS FOR THE CLASSIFICATION OF DATA OBJECTS

CROSS-REFERENCE TO RELATED APPLICATIONS

This application claims the benefit of the U.S. Provisional Patent Application Ser. No. 63/106,425 filed on Oct. 28, 2020, which is incorporated herein by reference in its entirety, including any figures, tables, and drawings. This application also claims the benefit of U.S. Provisional Patent Application Ser. No. 63/158,181 filed on Mar. 8, 2021, which is incorporated herein by reference in its entirety, including any figures, tables, and drawings.

BACKGROUND

Various embodiments of the present disclosure address technical challenges related to determining the proper classification of a recorded encounter. For example, various embodiments determine the proper classification of a medical encounter based at least in part on data extracted from a claim data object.

BRIEF SUMMARY

In general, embodiments of the present disclosure provide methods, apparatus, systems, computing devices, computing entities, and/or the like for determining the proper classification of a medical encounter based at least in part on a related claim data object. For example, a medical encounter may be associated with a prior classification, and various embodiments of the present disclosure determine a proper classification of the medical encounter which may or may not be the same classification as the prior classification. Certain embodiments of the present disclosure utilize systems, methods, and computer program products that process a claim data object to extract a plurality of code character strings and assign a claim classification to the claim data object based at least in part on the plurality of code character strings. Indeed, a claim classification is assigned to a claim data object in various embodiments of the present disclosure based at least in part on a multi-dimensional evaluation or analysis of code character strings and other data objects of the claim data object. For example, the claim data object is evaluated with respect to a first patient dimension, a first provider dimension, a second provider dimension, a third provider dimension, and a second patient dimension. Dimensions of a medical encounter and the claim data object that are evaluated may include the external cause or mechanism of the patient's injury, a primary diagnosis of the patient's injury or medical condition, procedures performed on the patient, secondary diagnoses of the patient's underlying conditions or comorbidities, and the patient's reason for visit.

In accordance with one aspect, a method is provided. In one embodiment, the method includes receiving a data object. The data object includes a plurality of code portions. Each code portion corresponds to a dimension of an encounter associated with the data object and includes one or more code character strings. The method further includes extracting a plurality of code character strings from the data object and generating a classification for the data object.

The classification for the data object is generated by generating and submitting a first query for a first encounter dimension datastore. The first query includes a first code character string of the plurality of code character strings. The first query is for the first encounter dimension datastore to (i) determine whether the first code character string is present in a reference code table of the first encounter dimension datastore, and (ii) provide a response indicating whether the first code character string is present in the reference code table of the first encounter dimension datastore.

The classification for the data object is further generated by, responsive to receiving a response for the first query indicating that the first code character string is present in the reference code table of the first encounter dimension datastore, generating and submitting a second query for a second encounter dimension datastore. The second query includes a second code character string of the plurality of code character strings. The second query is for the second encounter dimension datastore to (i) determine whether the second code character string is present in a reference code table of the second encounter dimension datastore, and (ii) provide a response indicating whether the second code character string is present in the reference code table of the second encounter dimension datastore.

The classification for the data object is further generated by, responsive to receiving a response for the second query indicating that the second code character string is present in the reference code table of the second encounter dimension datastore, (a) determining a classification for each of one or more third code character strings of the plurality of code character strings, (b) determining an aggregate score based at least in part on the classification for each of one or more third code character strings, and (c) determining whether the aggregate score satisfies a threshold score.

The classification for the data object is further generated by, responsive to determining that the aggregate score satisfies a threshold score, generating and submitting a fourth query for a fourth encounter dimension datastore. The fourth query includes a fourth code character string of the plurality of code character strings. The fourth query is for the fourth encounter dimension datastore to (i) determine whether the fourth code character string is present in a reference code table of the fourth encounter dimension datastore, and (ii) provide a response indicating whether the fourth code character string is present in the reference code table of the fourth encounter dimension datastore.

The classification for the data object is further generated by, responsive to receiving a response for the fourth query indicating that the fourth code character string is present in the reference code table of the fourth encounter dimension datastore, generating and submitting a fourth query for a fifth encounter dimension datastore. The fifth query includes a fifth code character string of the plurality of code character strings. The fifth query is for the fifth encounter dimension datastore to (i) determine whether the fifth code character string is present in a reference code table of the fifth encounter dimension datastore, and (ii) provide a response indicating whether the fifth code character string is present in the reference code table of the fifth encounter dimension datastore.

The classification for the data object is further generated by assigning a classification to the data object. The method further includes performing a classification-based action based at least in part on the classification.

In accordance with another aspect, a computer program product is provided. The computer program product may include at least one computer-readable storage medium having computer-readable program code portions stored therein. The computer-readable program code portions include executable portions configured to cause at least one processor to receive a data object. The data object includes a plurality of code portions. Each code portion corresponds to a dimension of an encounter associated with the data object and includes one or more code character strings. The computer-readable program code portions include executable portions configured to further cause at least one processor to extract a plurality of code character strings from the data object and generate a classification for the data object.

The classification for the data object is generated by generating and submitting a first query for a first encounter dimension datastore. The first query includes a first code character string of the plurality of code character strings. The first query is for the first encounter dimension datastore to (i) determine whether the first code character string is present in a reference code table of the first encounter dimension datastore, and (ii) provide a response indicating whether the first code character string is present in the reference code table of the first encounter dimension datastore.

The classification for the data object is further generated by, responsive to receiving a response for the first query indicating that the first code character string is present in the reference code table of the first encounter dimension datastore, generating and submitting a second query for a second encounter dimension datastore. The second query includes a second code character string of the plurality of code character strings. The second query is for the second encounter dimension datastore to (i) determine whether the second code character string is present in a reference code table of the second encounter dimension datastore, and (ii) provide a response indicating whether the second code character string is present in the reference code table of the second encounter dimension datastore.

The classification for the data object is further generated by, responsive to receiving a response for the second query indicating that the second code character string is present in the reference code table of the second encounter dimension datastore, (a) determining a classification for each of one or more third code character strings of the plurality of code character strings, (b) determining an aggregate score based at least in part on the classification for each of one or more third code character strings, and (c) determining whether the aggregate score satisfies a threshold score.

The classification for the data object is further generated by, responsive to determining that the aggregate score satisfies a threshold score, generating and submitting a fourth query for a fourth encounter dimension datastore. The fourth query includes a fourth code character string of the plurality of code character strings. The fourth query is for the fourth encounter dimension datastore to (i) determine whether the fourth code character string is present in a reference code table of the fourth encounter dimension datastore, and (ii) provide a response indicating whether the fourth code character string is present in the reference code table of the fourth encounter dimension datastore.

The classification for the data object is further generated by, responsive to receiving a response for the fourth query indicating that the fourth code character string is present in the reference code table of the fourth encounter dimension datastore, generating and submitting a fourth query for a fifth encounter dimension datastore. The fifth query includes a fifth code character string of the plurality of code character strings. The fifth query is for the fifth encounter dimension datastore to (i) determine whether the fifth code character string is present in a reference code table of the fifth encounter dimension datastore, and (ii) provide a response indicating whether the fifth code character string is present in the reference code table of the fifth encounter dimension datastore.

The classification for the data object is further generated by assigning a classification to the data object. The computer-readable program code portions include executable portions configured to further cause at least one processor to perform a classification-based action based at least in part on the classification.

In accordance with yet another aspect, an apparatus including at least one processor and at least one memory including computer program code is provided. In one embodiment, the at least one memory and the computer program code may be configured to, with at least one processor, cause the apparatus to receive a data object. The data object includes a plurality of code portions. Each code portion corresponds to a dimension of an encounter associated with the data object and includes one or more code character strings. In one embodiment, the at least one memory and the computer program code may be configured to, with at least one processor, further cause the apparatus to extract a plurality of code character strings from the data object and generate a classification for the data object.

The classification for the data object is generated by generating and submitting a first query for a first encounter dimension datastore. The first query includes a first code character string of the plurality of code character strings. The first query is for the first encounter dimension datastore to (i) determine whether the first code character string is present in a reference code table of the first encounter dimension datastore, and (ii) provide a response indicating whether the first code character string is present in the reference code table of the first encounter dimension datastore.

The classification for the data object is further generated by, responsive to receiving a response for the first query indicating that the first code character string is present in the reference code table of the first encounter dimension datastore, generating and submitting a second query for a second encounter dimension datastore. The second query includes a second code character string of the plurality of code character strings. The second query is for the second encounter dimension datastore to (i) determine whether the second code character string is present in a reference code table of the second encounter dimension datastore, and (ii) provide a response indicating whether the second code character string is present in the reference code table of the second encounter dimension datastore.

The classification for the data object is further generated by, responsive to receiving a response for the second query indicating that the second code character string is present in the reference code table of the second encounter dimension datastore, (a) determining a classification for each of one or more third code character strings of the plurality of code character strings, (b) determining an aggregate score based at least in part on the classification for each of one or more third code character strings, and (c) determining whether the aggregate score satisfies a threshold score.

The classification for the data object is further generated by, responsive to determining that the aggregate score satisfies a threshold score, generating and submitting a fourth query for a fourth encounter dimension datastore. The fourth query includes a fourth code character string of the plurality of code character strings. The fourth query is for the fourth encounter dimension datastore to (i) determine whether the fourth code character string is present in a reference code table of the fourth encounter dimension datastore, and (ii)

provide a response indicating whether the fourth code character string is present in the reference code table of the fourth encounter dimension datastore.

The classification for the data object is further generated by, responsive to receiving a response for the fourth query indicating that the fourth code character string is present in the reference code table of the fourth encounter dimension datastore, generating and submitting a fourth query for a fifth encounter dimension datastore. The fifth query includes a fifth code character string of the plurality of code character strings. The fifth query is for the fifth encounter dimension datastore to (i) determine whether the fifth code character string is present in a reference code table of the fifth encounter dimension datastore, and (ii) provide a response indicating whether the fifth code character string is present in the reference code table of the fifth encounter dimension datastore.

The classification for the data object is further generated by assigning a classification to the data object. In one embodiment, the at least one memory and the computer program code may be configured to, with at least one processor, cause the apparatus to perform a classification-based action based at least in part on the classification.

BRIEF DESCRIPTION OF THE DRAWINGS

Figure 1:
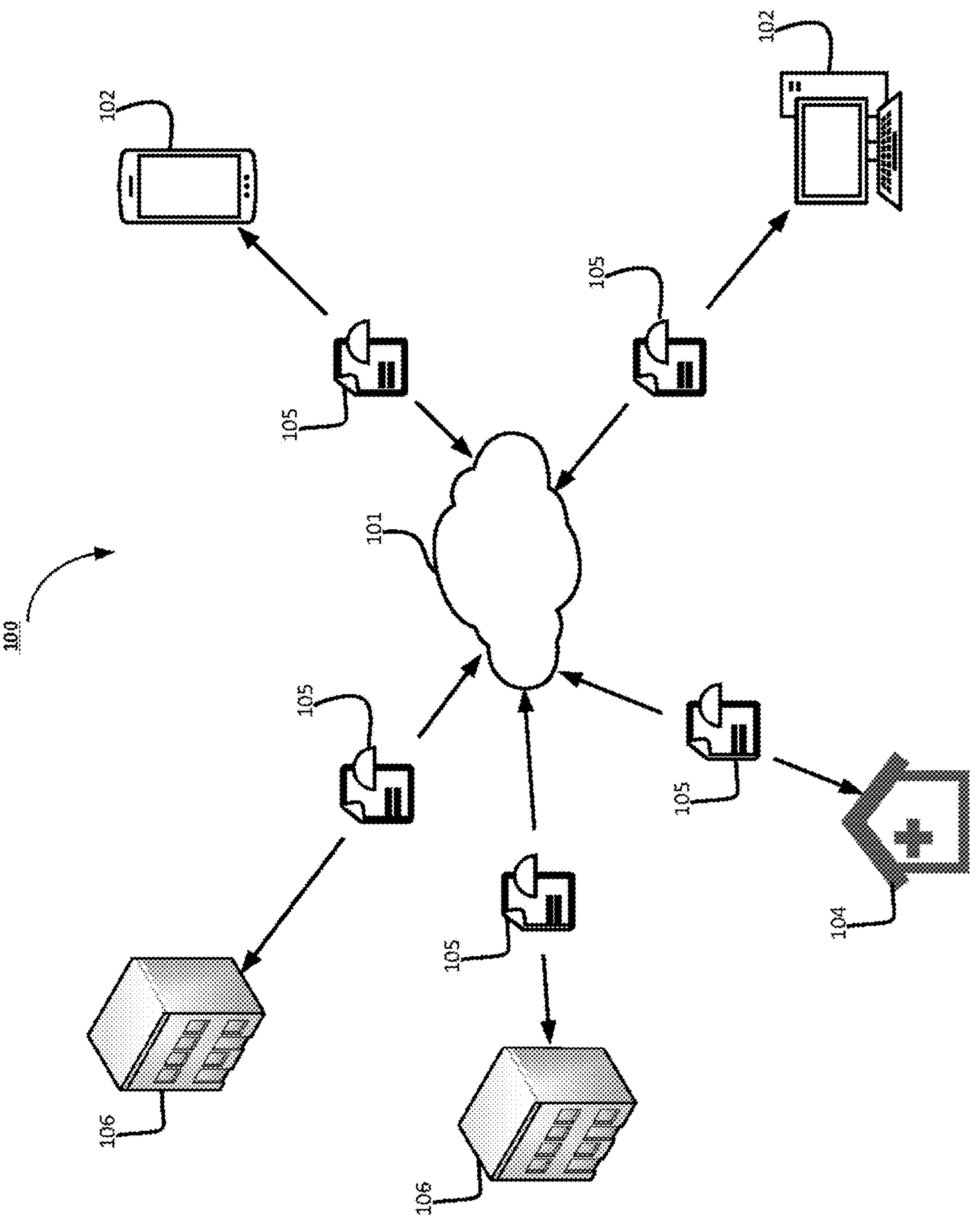

Having thus described the present disclosure in general terms, reference will now be made to the accompanying drawings, which are not necessarily drawn to scale, and wherein:

FIG. 1 provides an exemplary overview of a system that may be used to practice embodiments of the present disclosure.

Figure 2:
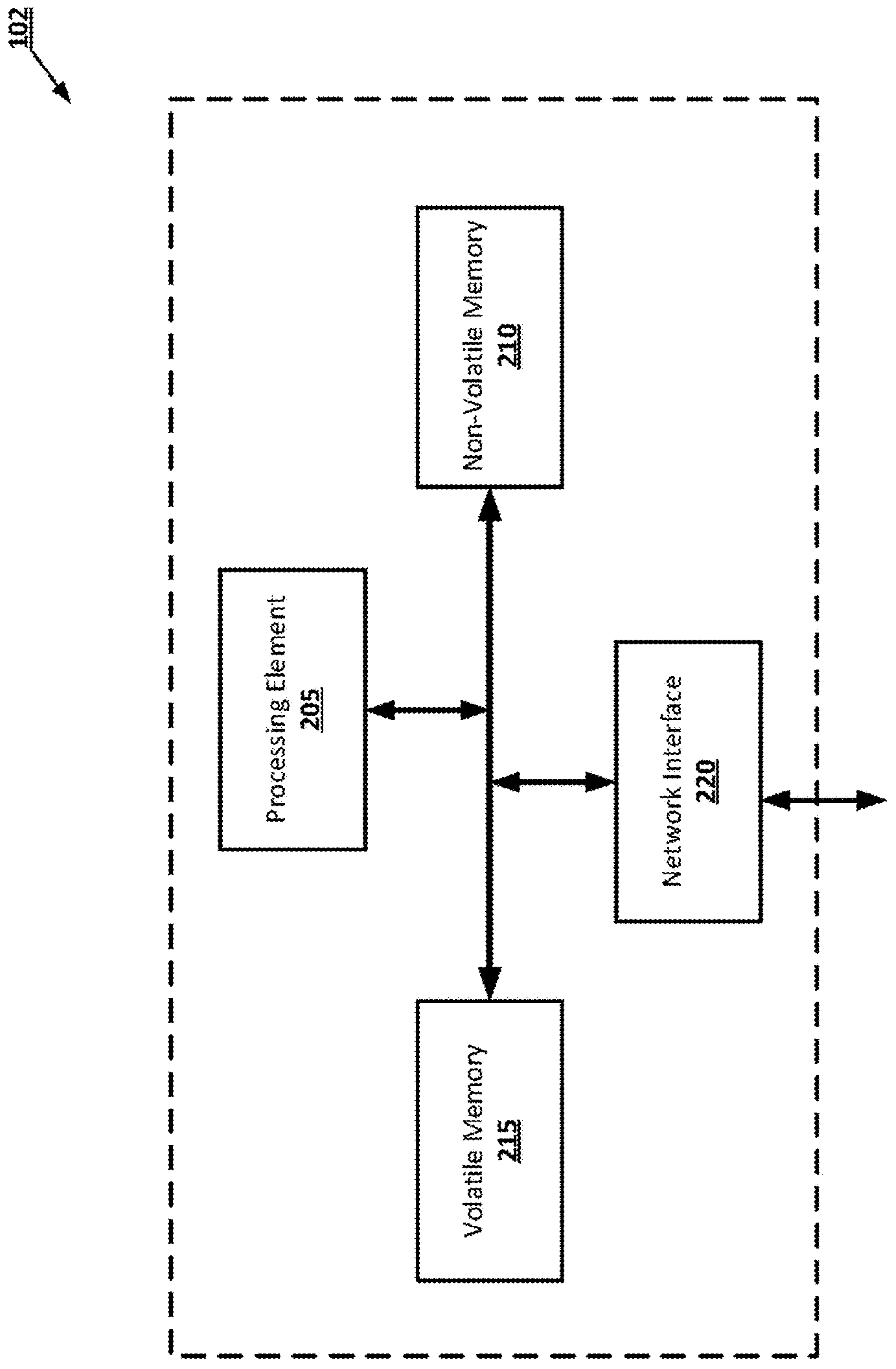

FIG. 2 provides a diagram of an example system computing entity, in accordance with some embodiments discussed herein.

Figure 3:
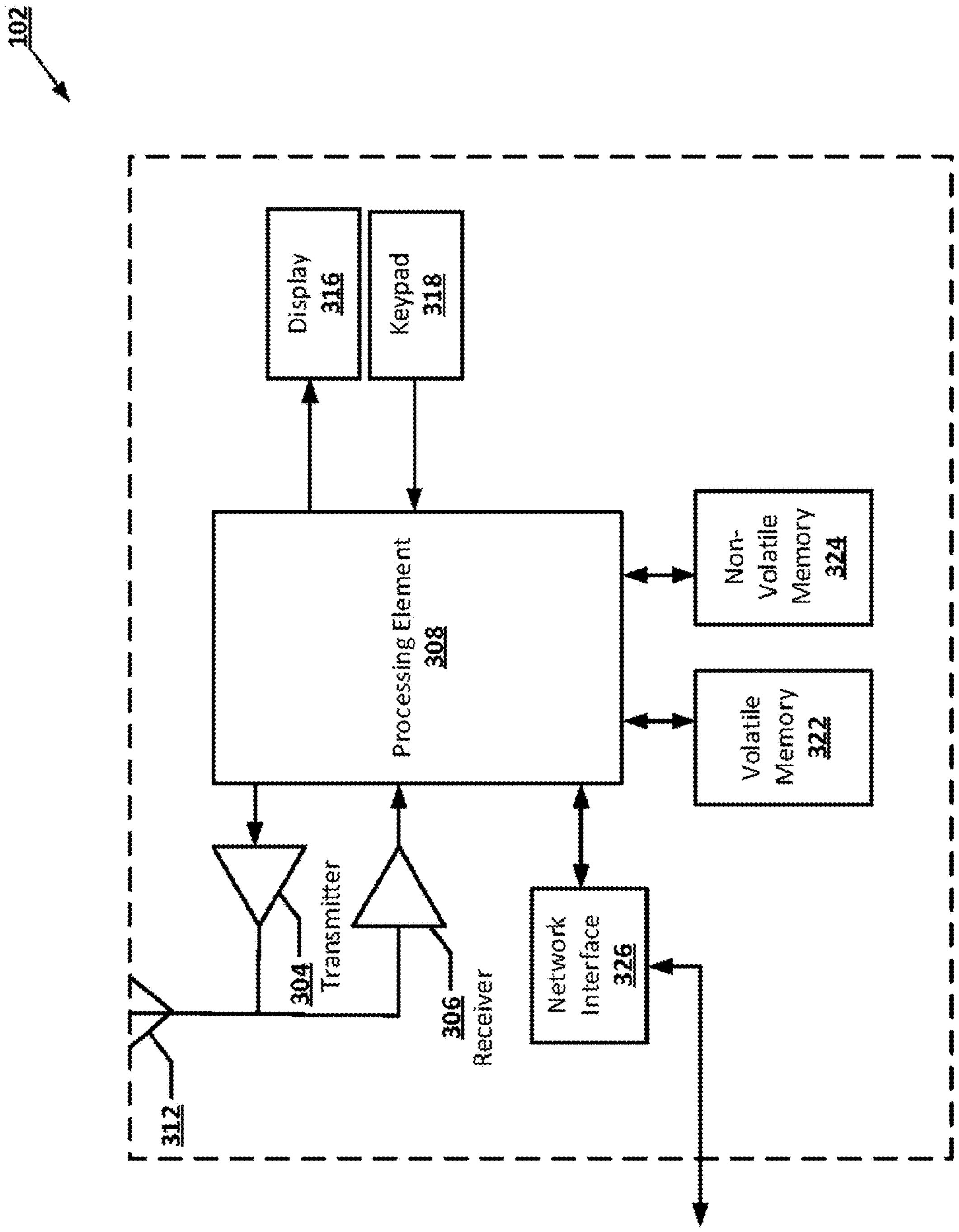

FIG. 3 provides a diagram of another example system computing entity, in accordance with some embodiments discussed herein.

Figure 4:
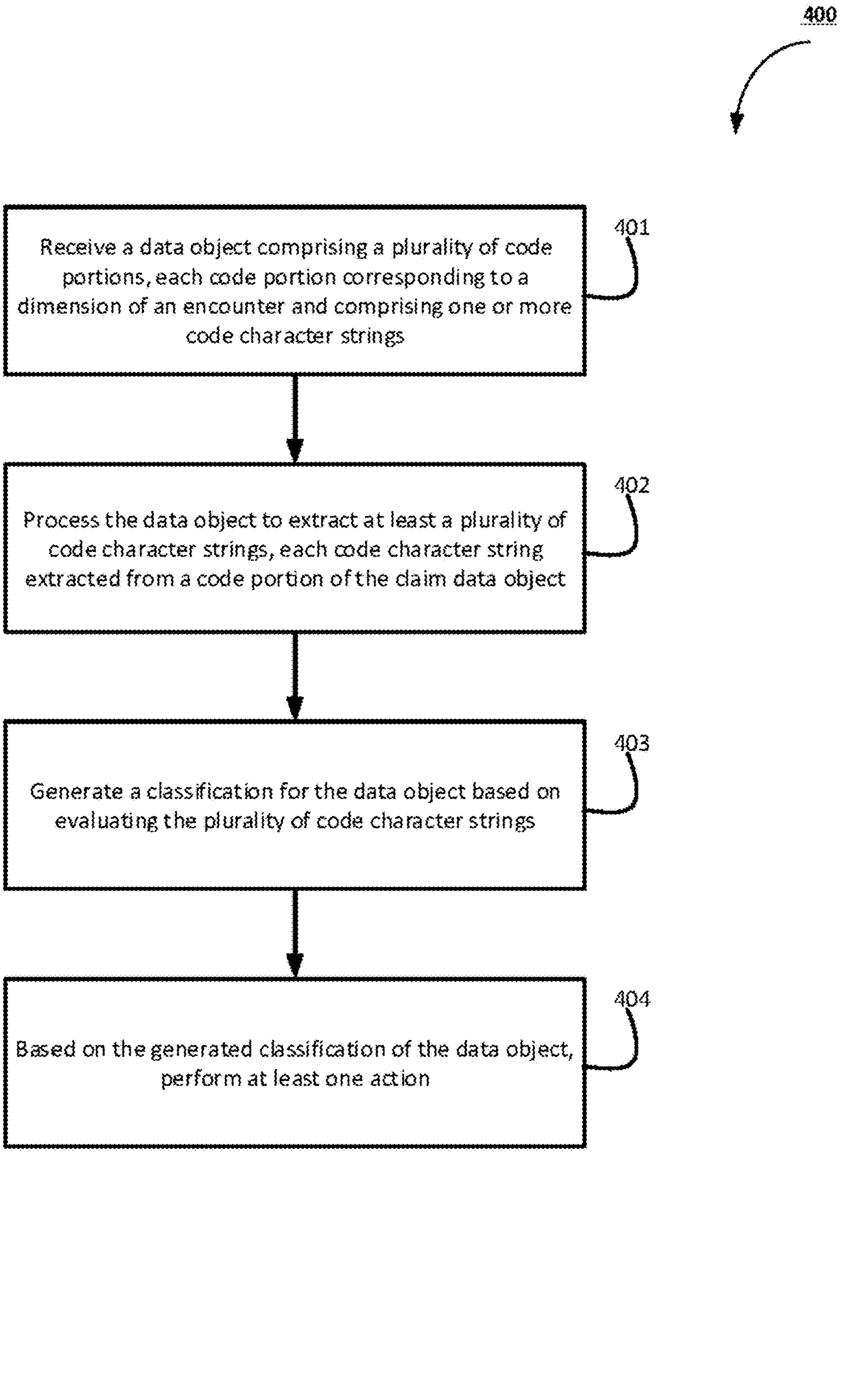

FIG. 4 provides a flowchart diagram of an example process for classifying the emergent classification of a claim data object, in accordance with some embodiments discussed herein.

Figure 5A:
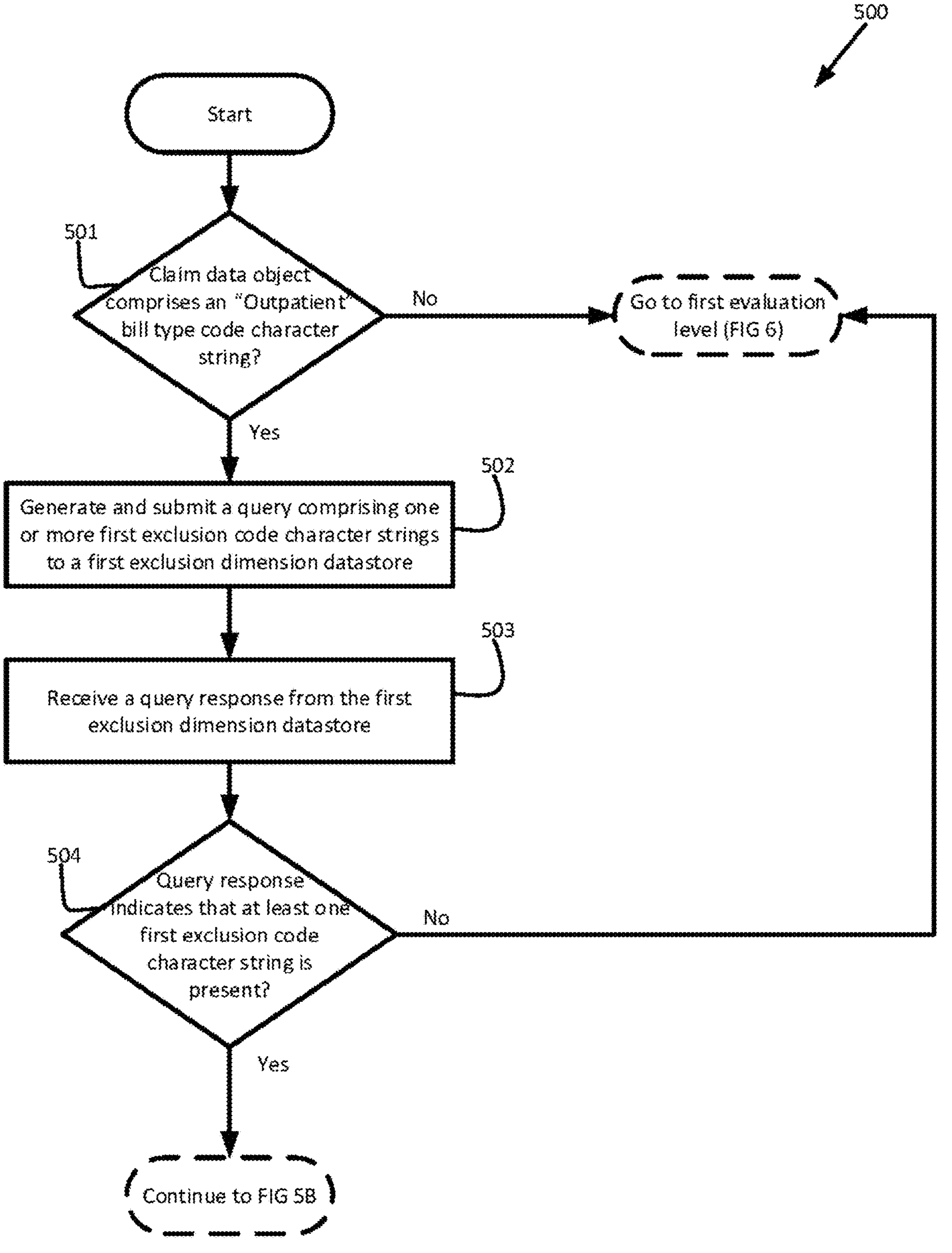

FIG. 5A provides a flowchart diagram of an example process for determining the emergent classification of a claim data object, in accordance with some embodiments discussed herein.

Figure 5B:
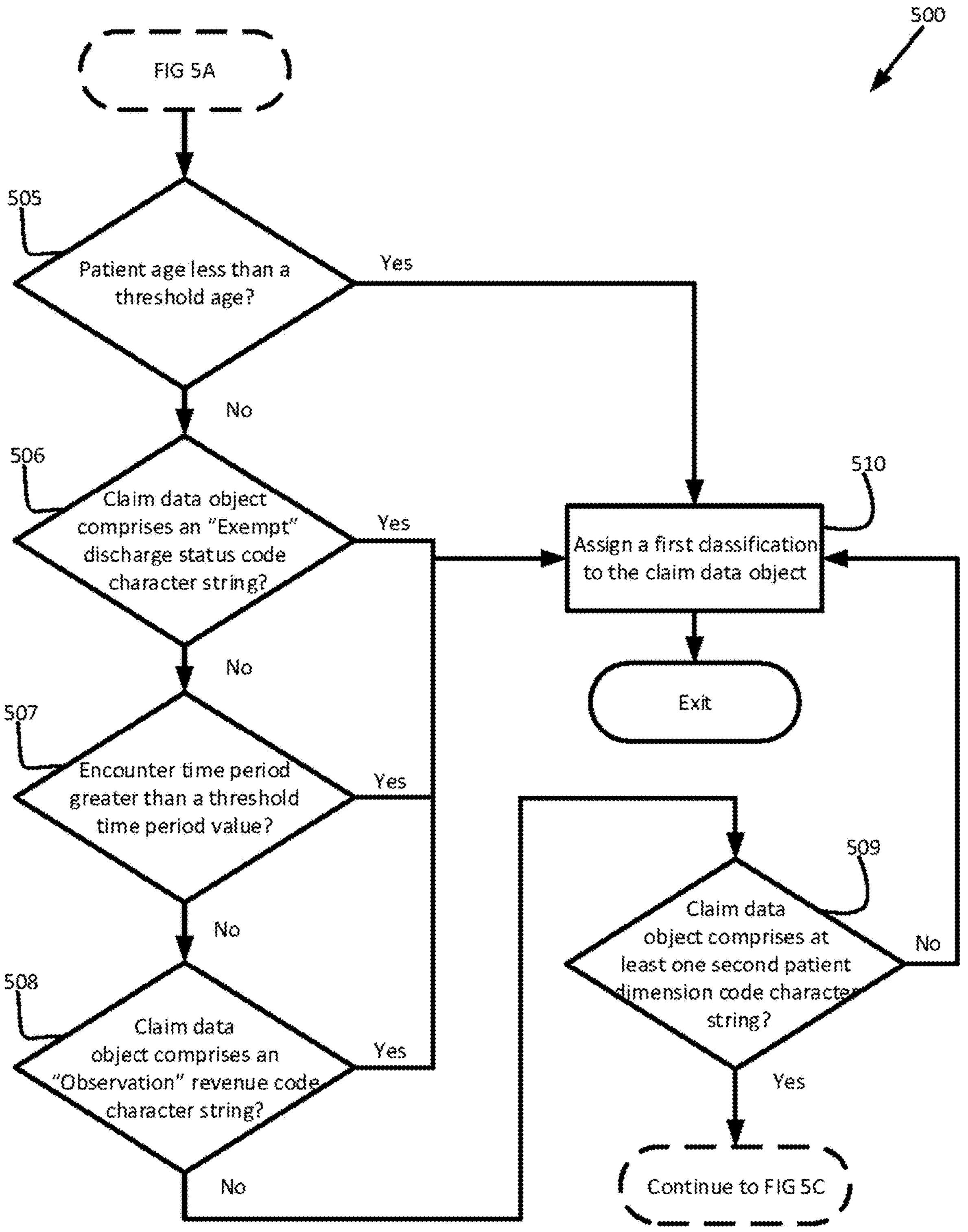

FIG. 5B provides a flowchart diagram of an example process for determining the emergent classification of a claim data object, in accordance with some embodiments discussed herein.

Figure 5C:
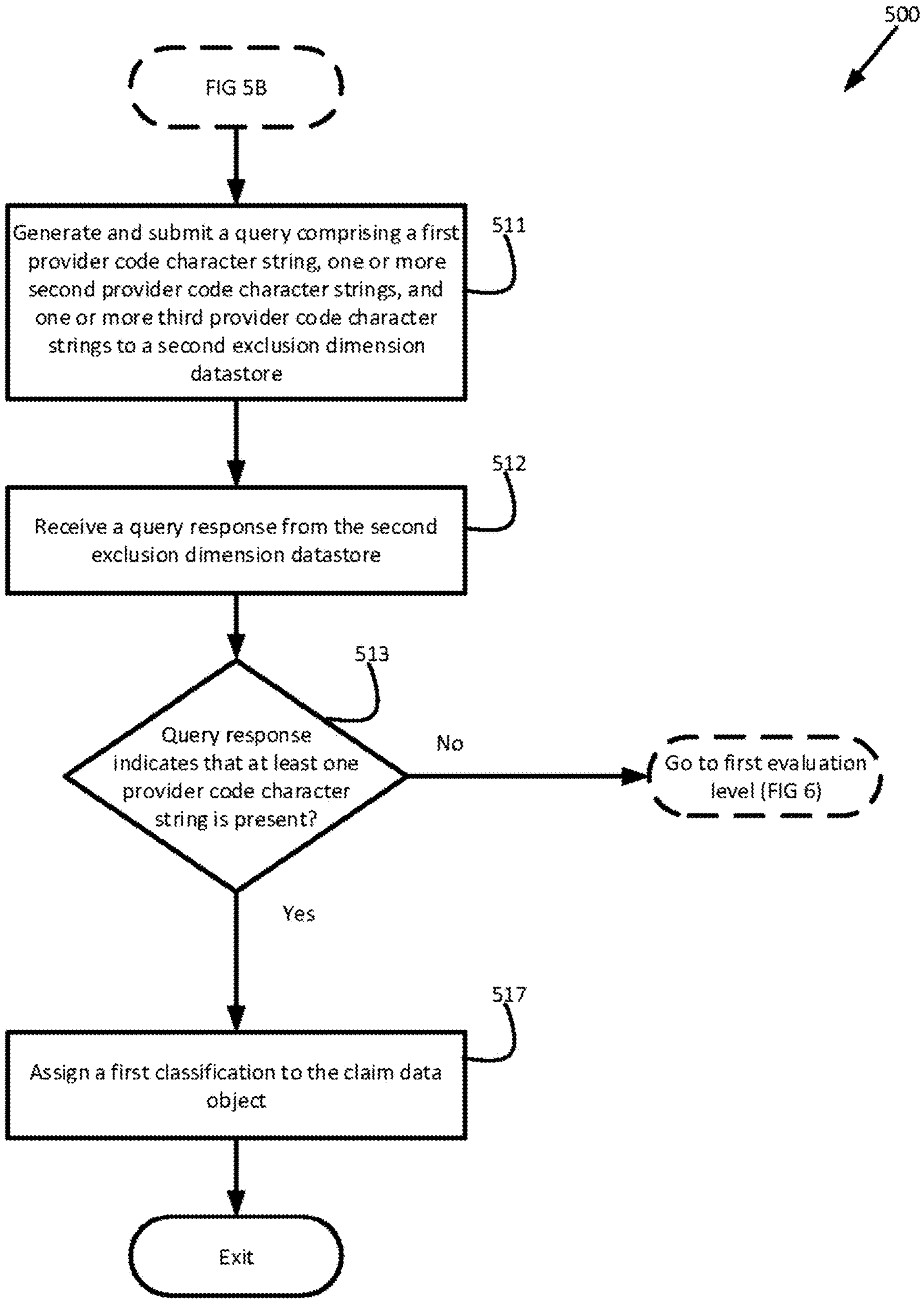

FIG. 5C provides a flowchart diagram of an example process for determining the emergent classification of a claim data object, in accordance with some embodiments discussed herein.

Figure 6:
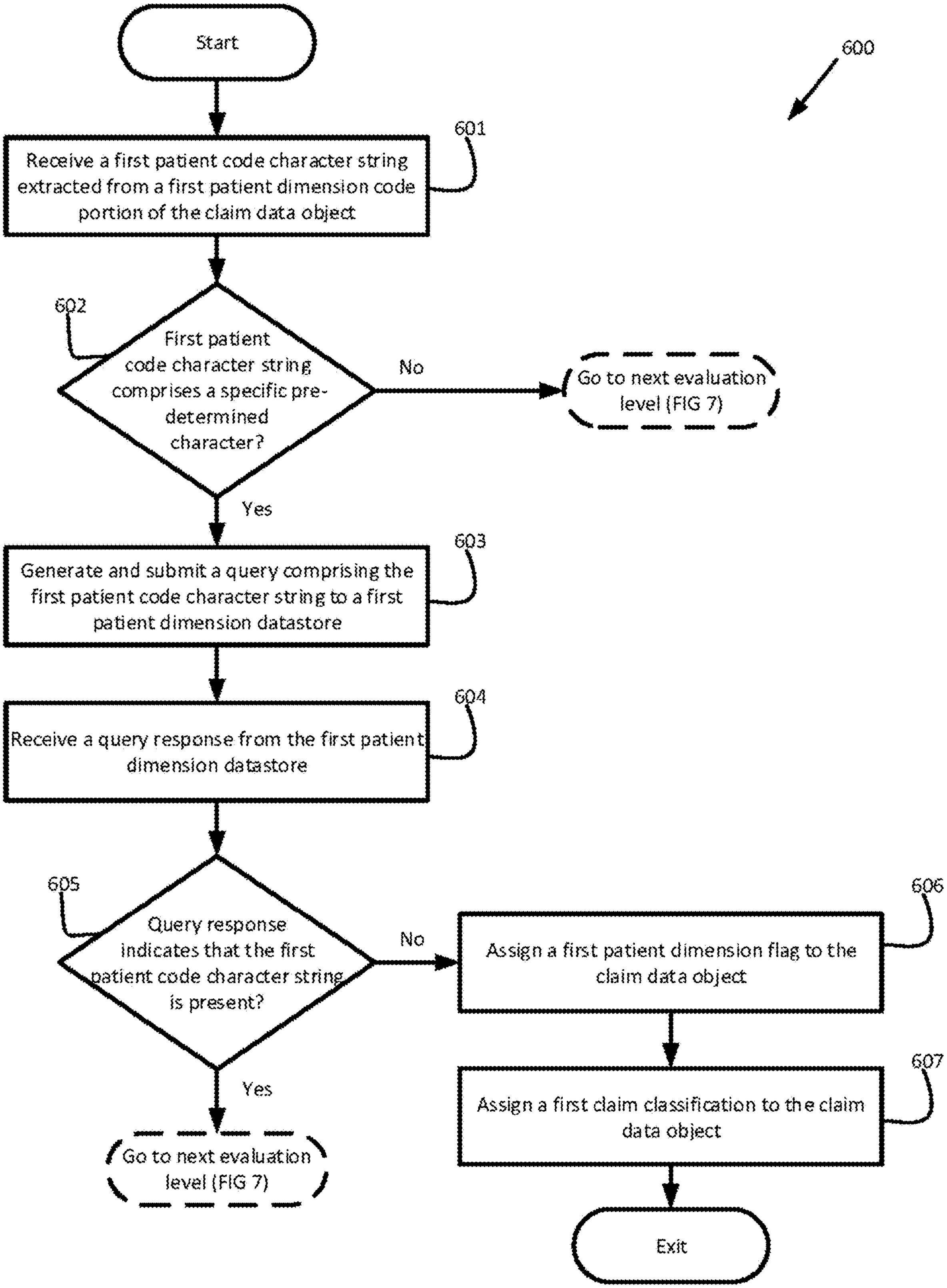

FIG. 6 provides a flowchart diagram of an example process for determining the emergent classification of a claim data object, in accordance with some embodiments discussed herein.

Figure 7:
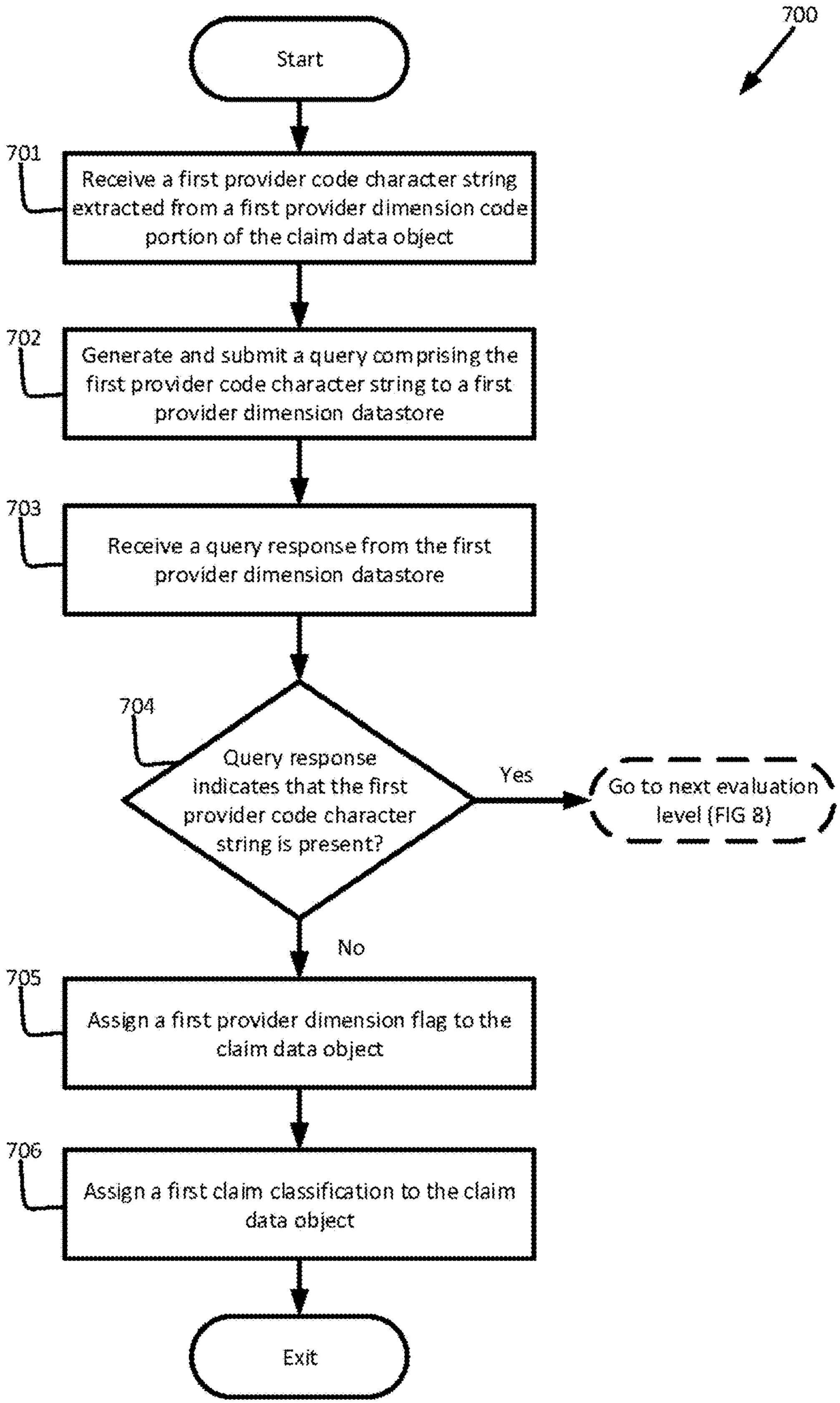

FIG. 7 provides a flowchart diagram of an example process for determining the emergent classification of a claim data object, in accordance with some embodiments discussed herein.

Figure 8:
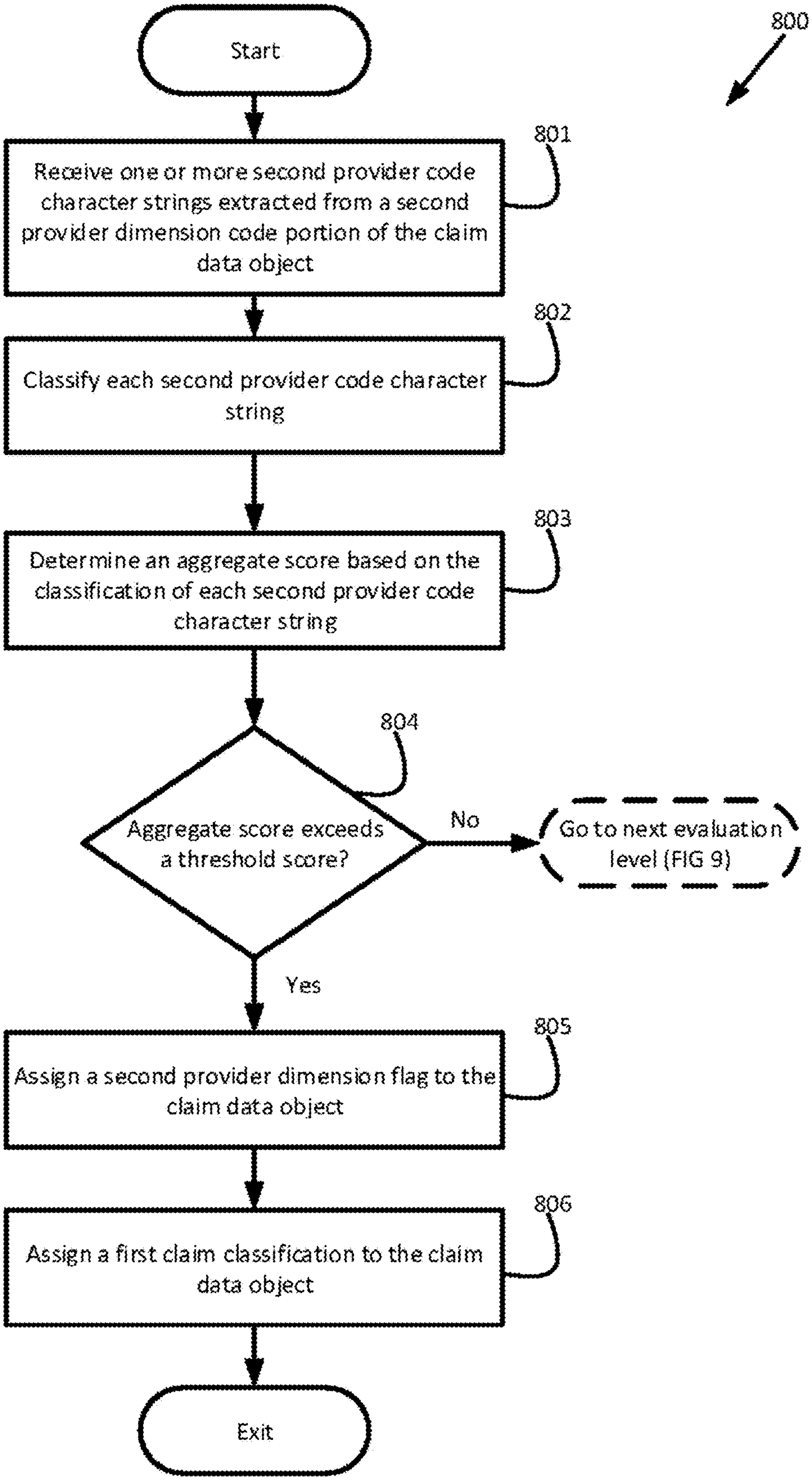

FIG. 8 provides a flowchart diagram of an example process for determining the emergent classification of a claim data object, in accordance with some embodiments discussed herein.

Figure 9:
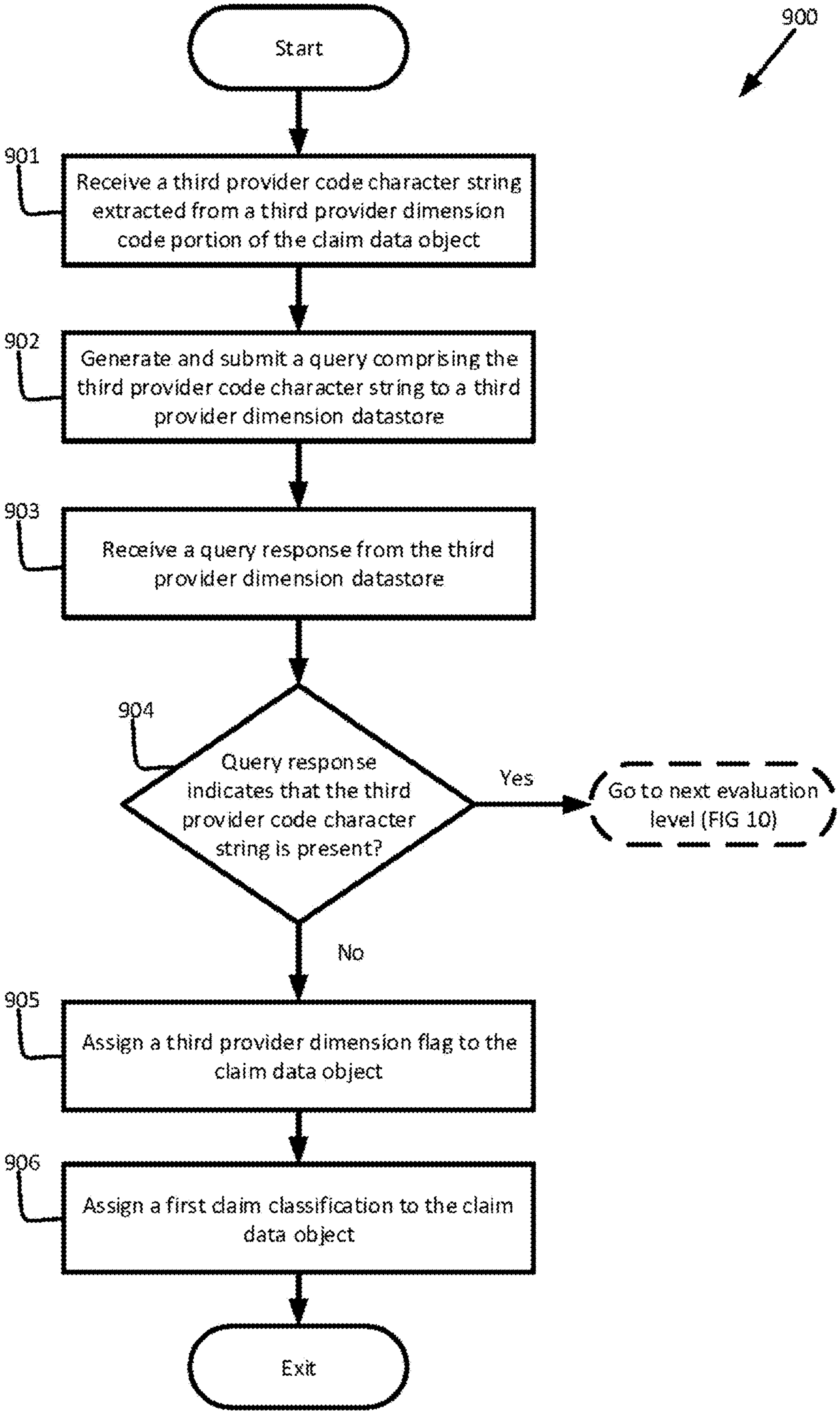

FIG. 9 provides a flowchart diagram of an example process for determining the emergent classification of a claim data object, in accordance with some embodiments discussed herein.

Figure 10:
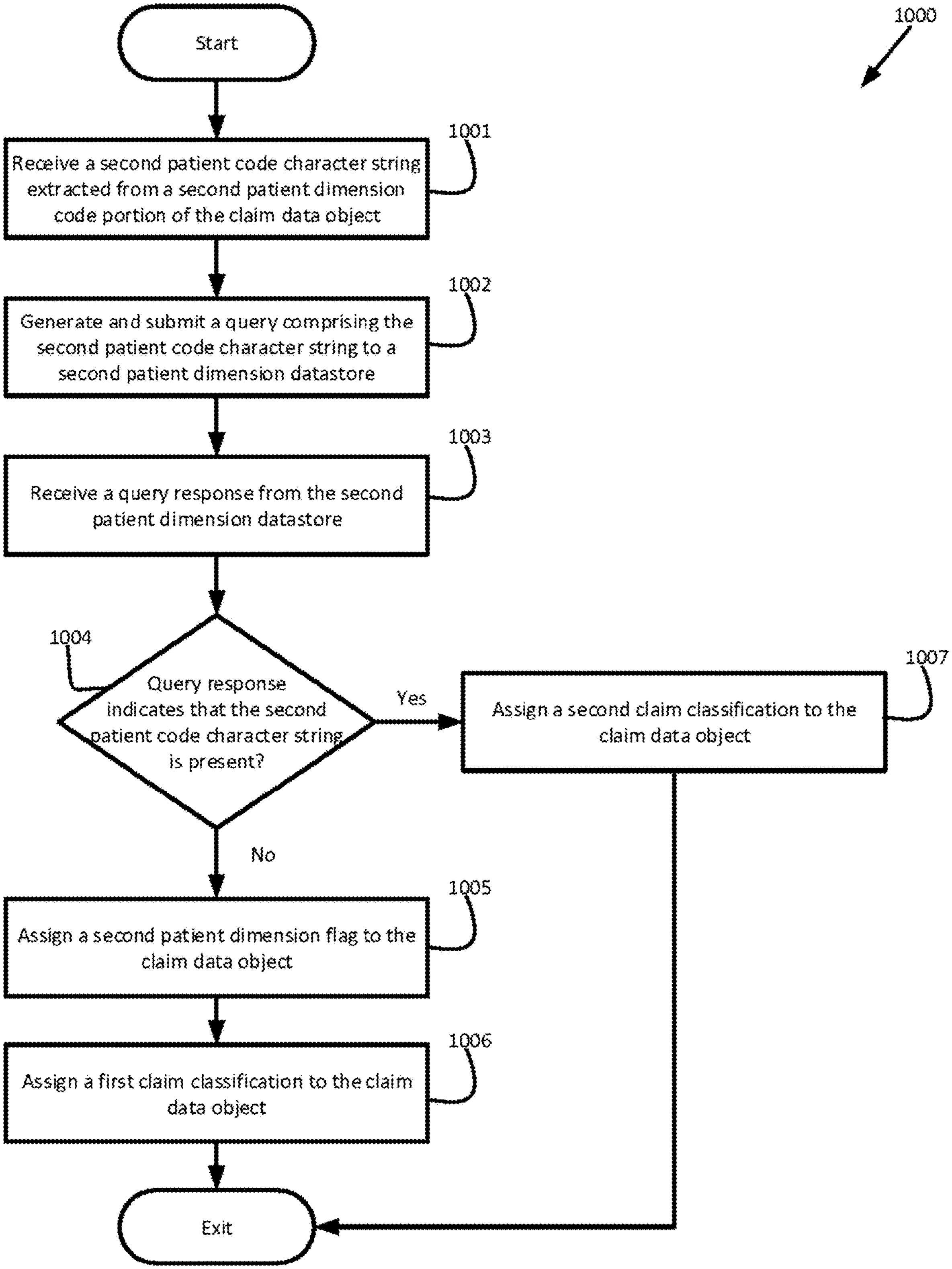

FIG. 10 provides a flowchart diagram of an example process for determining the emergent classification of a claim data object, in accordance with some embodiments discussed herein.

Figure 11:
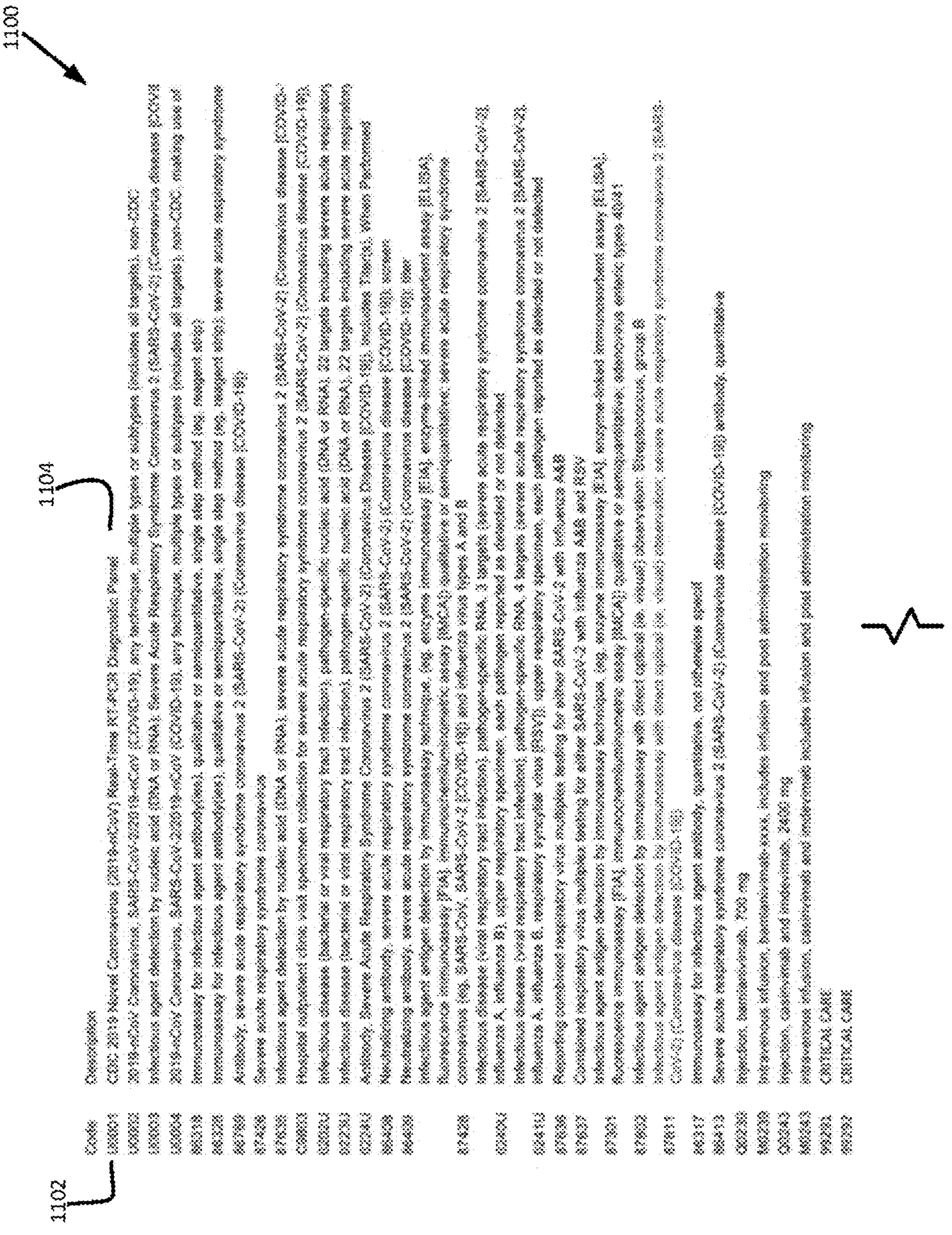

FIG. 11 provides a table illustrating at least a portion of a datastore, in accordance with some embodiments discussed herein.

FIG. 12 provides a table illustrating at least a portion of a datastore, in accordance with some embodiments discussed herein.

FIG. 13 provides a table illustrating at least a portion of a datastore, in accordance with some embodiments discussed herein.

FIG. 14A provides a table for evaluating a claim data object with respect to a dimension, in accordance with some embodiments discussed herein.

FIG. 14B provides a table for evaluating a claim data object with respect to a dimension, in accordance with some embodiments discussed herein.

FIG. 15 provides a table illustrating at least a portion of a datastore, in accordance with some embodiments discussed herein.

FIG. 16 provides a table illustrating at least a portion of a datastore, in accordance with some embodiments discussed herein.

DETAILED DESCRIPTION

Various embodiments of the present disclosure now will be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to data object analysis and evaluation, one of ordinary skill in the art will recognize that the disclosed concepts can be used to perform other types of data analysis.

I. Overview and Technical Improvements

Various embodiments of the present disclosure address technical challenges related to classifying a data object and/or an encounter described by the data object. An example that will be referenced throughout the present disclosure involves classifying a data object describing a medical encounter, where the data object may be, may be based at least in part on, may comprise, and/or the like, a healthcare claim. However, it will be understood that various embodiments of the present disclosure may provide technical solutions to different applications and apply to various other examples. In the medical encounter example, a healthcare provider may submit a healthcare claim for an emergency visit (the encounter) by a patient to a payer. However, it has been found that up to 30% of such emergency visits (encounters) by a patient can be considered improperly classified (e.g., non-emergent visits classified as emergent and/or the like). For example, an emergency visit considered to be non-emergent may include a visit where the condition or injury of the patient does not necessitate emergency care, a visit where the services provided by the healthcare provider do not need to be performed in an emergency setting, and/or the like. The financial cost of emergency visits is high and increasing; thus, properly classification of data objects and subsequent reduction of inaccurately classified claims exists as a technical need in the field.

Existing approaches of classifying a data object rely on an evaluation of a single aspect or piece of data of the data object, such as a final diagnosis of the patient's condition. Such existing classification approaches are accompanied with high false negative rates. Returning to the example of the classification of a claim, many claims that a patient may consider to be emergent are classified as non-emergent, thus resulting in abrasion and scrutiny by the patient. Further, such existing classification approaches are manual and labor intensive in nature.

Various embodiments of the present disclosure provide technical solutions to the aforementioned technical problems, and may be used, for example, by healthcare payers to accurately, reliably, and consistently determine a proper classification of the medical encounter described by a data object. Various embodiments employ a multi-dimensional evaluation of the data object describing the encounter. Evaluating more than one dimension of the encounter enables a deeper assessment and evaluation of the encounter and ensures that most, if not all, relevant information or data of the encounter are considered. Intentional selection and definition of encounter dimensions in various embodiments further enable deep and accurate assessments, evaluations, and classification. In the medical encounter example, at least one dimension relating to the patient's perspective of the medical encounter and at least one dimension relating to the healthcare provider's perspective of the medical encounter may be evaluated, thereby ensuring that the proper classification of the medical encounter is based at least in part on both a patient perspective and a healthcare provider perspective. Various embodiments may evaluate two patient dimensions relating to the patient's reason for visit and the external cause or mechanism of the patient's injury, and three provider dimensions relating to the primary diagnosis of the patient's condition, secondary diagnoses of the patient's condition, and performed procedures. Thus, various embodiments may comprise a deep five-dimensional evaluation and classification of a medical encounter that leverages both a patient's emergent standards and a healthcare provider's emergent standards. Using the various embodiments provided herein, a healthcare payer may then obtain a set of claims with a proper non-emergent classification that were treated in an emergent setting (e.g., an emergency department or room) and/or otherwise perform various classification-based actions.

Various embodiments provide further technical advantages by being implemented in a cloud-based computer architecture and/or being implemented at least in part as a service software. For example, multiple healthcare payers or customers may use a system embodying the various embodiments of the present disclosure by each providing one or more data objects each describing medical encounters, where each data object is evaluated and classified. Various embodiments comprise a system Application Programming Interface (API) where a healthcare payer may transmit a system API call comprising a data object describing a medical encounter and receive a system API response with an indication of the classification of the claim (e.g., emergent or non-emergent).

Data objects and healthcare claims submitted by different healthcare payers may also be evaluated in a different manner based at least in part on payer-unique or customer-unique configurations. Each healthcare payer or customer may have different classification standards and definitions (e.g., for non-emergent encounters) and may be enabled to configure the various embodiments provided herein based at least in part on each such standards. For example, a first healthcare payer may consider a particular primary diagnosis to be non-emergent, while a second healthcare payer may consider the same primary diagnosis to be emergent. Various embodiments may then be configured to evaluate data objects provided by the first healthcare payer based at least in part on the particular primary diagnosis being non-emergent and to separately evaluate data objects provided by the second healthcare payer based at least in part on the particular primary diagnosis being emergent.

An exemplary application of various embodiments of the present disclosure relates to receiving a claim data object comprising a plurality of code portions, code sections, slots, and/or similar words used herein interchangeably, each code portion corresponding to a dimension of the medical encounter; processing the claim data object to extract at least a plurality of code character strings, each code character string extracted from a corresponding code portion of the claim data object; generating a claim classification for the claim data object based at least in part on evaluating the plurality of code character strings, wherein (i) the plurality of code character strings is evaluated with respect to a first patient dimension relating to the patient's contribution to the medical encounter, (ii) the plurality of code character strings is evaluated with respect to a first provider dimension relating to a provider's contribution to the medical encounter, (iii) the plurality of code character strings is evaluated with respect to a second provider dimension relating to a provider's contribution to the medical encounter, (iv) the plurality of code character strings is evaluated with respect to a third provider dimension relating to a provider's contribution to the medical encounter, and (v) the plurality of code character strings is evaluated with respect to a second patient dimension relating to the patient's contribution to the medical encounter; and performing at least one classification-based action.

II. Definitions

The terms "data object" or "claim data object" may refer to an electronically-stored data entity configured to describe an encounter (e.g., a medical encounter). For example, a data object may be, may be based at least in part on, and/or may comprise healthcare claim describing a medical encounter (e.g., a UB-04 claim form). In referring to an example encounter being a medical encounter herein, a data object may be referred to or understood as a claim data object or an encounter data object. In some embodiments, a data object may be configured to describe a medical encounter between a healthcare provider and a patient. For example, a healthcare provider generates a data object and/or generates data values and data objects within a data object to describe a medical encounter between the healthcare provider and a patient. The data object may comprise a plurality of code portions, each code portion comprising, containing, storing, and/or the like a data value or data object describing a dimension or aspect of the medical encounter. For example, a code portion, code section, slot, and/or similar words used herein interchangeably of the data object may be configured to store a numerical value, a categorical value, and/or the like. Various dimensions of a medical encounter described by the data object—or data values and/or data objects of the claim data object—may be patient demographic information, procedures performed on the patient, the medical condition of the patient, and/or the like. In various embodiments, the claim data object comprises code character strings of different types describing different dimensions or aspects of an encounter. A data object may be represented in various forms, such as any n-order tensor (e.g., a vector, an array, a matrix), a data structure, embeddings, and/or the like.

The term "code character string" may refer to a data entity configured to describe a dimension or aspect of an encounter (e.g., a medical encounter). In various embodiments, a code character string may be a part of and/or may be stored in a claim data object. That is, a claim data object comprises a plurality of code character strings. In various embodiments, code character strings are configured to describe a particular dimension or aspect of a medical encounter. For example, a first dimension code object may be configured to describe a dimension of the medical encounter relating to the patient injury prompting the medical encounter, while a second dimension code object may be configured to describe another dimension of the medical encounter relating to a primary diagnosis of the patient's medical condition. In various embodiments, code character strings comprise International Statistical Classification of Diseases (ICD) codes (e.g., ICD-9-CM codes, ICD-10-CM codes), Current Procedural Terminology (CPT) codes, Healthcare Common Procedure Coding System (HCPCS) codes, revenue codes, and/or the like, which are configured to describe at least patient injuries, diagnoses of patient medical conditions, procedures performed on patients, underlying medical conditions or comorbidities of patients, and/or reasons for the medical encounter in a standardized manner or coding convention. A code character string may be a data structure, an n-order tensor (e.g., a vector, an array, a matrix), embeddings of a claim data object, datasets, and/or the like.

The term "patient dimension code character string" may refer to a data entity configured to describe a dimension of a medical encounter oriented to a patient perspective. Specifically, a patient dimension code character string is a code character string describing a patient perspective dimension. In various embodiments, a claim data object comprises one or more patient dimension code character strings. For instance, a claim data object describing a UB-04 claim form comprises one or more first patient dimension code character strings describing a first patient perspective dimension of a medical encounter relating to an external cause or mechanism of an injury to the patient. A claim data object may further comprise one or more second patient dimension code character strings describing a second patient perspective dimension of a medical encounter relating to a patient's reason for visit to the healthcare provider (e.g., an emergency department) or a patient's reason for the encounter. Thus, a claim data object may comprise patient dimension code character strings corresponding to least one patient dimension (e.g., first and second patient dimensions). In various embodiments, both first patient dimension code character strings and second patient dimension code character strings are and/or comprise ICD codes describing, respectively: (i) an external cause of patient injury, and (ii) the patient's reasons for visit or injury. A patient dimension code character string may be a data structure, an n-order tensor, embeddings, a dataset, and/or the like.

The term "provider dimension code character string" may refer to a data entity configured to describe a dimension of a medical encounter oriented to a healthcare provider perspective. Specifically, a provider dimension code character string is a code character string describing a provider perspective dimension. In various embodiments, a claim data object comprises one or more provider dimension code character strings. In various embodiments, a claim data object comprises provider dimension code character strings corresponding to at least one provider dimension. For instance, a first provider dimension may relate to a primary diagnosis made (e.g., by emergency department doctors or experts) concerning the patient's medical condition, and the claim data object comprises one or more first provider dimension code character strings that are and/or comprise ICD codes describing the patient's medical condition from the perspective of the healthcare provider (e.g., emergency department doctors or experts). For instance, a second provider dimension may relate to procedures performed on the patient while in the care of the healthcare provider (e.g., an emergency department), and the claim data object comprises one or more second provider dimension code character strings that are and/or comprise CPT codes describing the various procedures performed by the healthcare provider on the patient. For instance, a third provider dimension may relate to secondary diagnosis made (e.g., by emergency department doctors or experts) concerning any underlying conditions or comorbidities of the patient, and the claim data object comprises one or more third provider dimension code character strings that are and/or comprise ICD codes describing the patient's comorbidities from the perspective of the healthcare provider (e.g., emergency department doctors or experts). Thus, an example claim data object comprises provider dimension code character strings from at least three provider dimensions. A provider dimension code character string may be a data structure, an n-order tensor, embeddings, a dataset, and/or the like.

The term "dimension datastore" may refer to a data entity configured to perform various methods, operations, functions, and/or the like to process code character strings and/or claim data objects. A dimension datastore may comprise data structures (e.g., lists, linked lists, arrays, matrices, graphs, trees) configured to store reference values, such as reference ICD codes, CPT codes, and/or the like. Specifically, a dimension datastore may comprise one or more reference code tables storing store reference values in relation to one dimension of a medical encounter. For example, a first patient dimension datastore stores ICD codes for a first patient dimension of a medical encounter relating the external cause or mechanism of the patient's injury. In various embodiments, dimension datastores are further configured to receive data, such as a code character string, and transmit data, such as a response to a code character string. For example, dimension datastores may be implemented with application programming interfaces (API), where dimension datastores receive data in the form of datastore API calls and provide data in the form of datastore API responses. Various embodiments of the present disclosure implement at least one dimension datastore, and each dimension datastore may be configured differently based at least in part on a corresponding dimension of a medical encounter. For example, a first dimension datastore stores a first set of reference ICD codes, while a second dimension datastore stores a second set of reference ICD codes different than the reference ICD codes in the first set. As such, each dimension datastore may be configured to process code character strings and/or data objects in a different manner. In various embodiments, a data object is processed by at least one dimension datastore. In various embodiments, a data object—or code character strings extracted from the claim data object—are processed by at least a first encounter dimension datastore, a second encounter dimension datastore, a third encounter dimension datastore, a fourth encounter dimension datastore, and a fifth encounter dimension datastore. In an example embodiment, code character strings are processed by a first patient dimension datastore, a first provider dimension datastore, a second provider dimension datastore, a third provider dimension datastore, and a second patient dimension datastore.

The term "dimension flag" may refer to a data entity configured to describe a claim data object with respect to a dimension of a corresponding medical encounter. In various embodiments, a dimension flag may comprise one or more numerical values, one or more categorical values, and/or the like. For instance, a dimension flag comprises a binary value that describes a data object with respect to a dimension of a corresponding encounter. For example, a first patient dimension flag assigned to a claim data object may indicate that the medical encounter described by a claim data object is determined to be emergent with respect to the first patient dimension relating to external cause or mechanism of the patient's injury. In various embodiments, a dimension flag may be a data entity configured to be assigned to a data object. For example, a dimension flag may be concatenated to a claim data object, stored within a claim data object, be linked to a claim data object, and/or the like.

The term "classification" may refer to a data entity configured to describe the proper classification generated, determined, and assigned for a data object by various embodiments. In some examples, a "claim classification" may be assigned to a claim data object. A classification may be generated, determined, assigned, and/or the like based at least in part on evaluation of a data object across multiple dimensions. In some examples, a classification may describe an emergent classification of a claim data object. For example, a first claim classification (e.g., emergent) is assigned to claim data objects of an emergent classification, and a second claim classification (e.g., non-emergent) is assigned to claim data objects of a non-emergent classification. In various embodiments, a claim classification may be a numerical value describing a claim data object, where the claim data object is described in a non-binary manner. In various embodiments, a classification may be concatenated to a data object, stored within a data object, linked to a data object, and/or the like. A classification may indicate various future actions (e.g., classification-based actions) to be performed on or with the data object. For example, a particular action may be performed for a data object assigned with a first classification (e.g., emergent), whereas another action may be performed for a data object assigned with a second classification (e.g., non-emergent). Thus, a classification may serve as an indicator for future classification-based actions.

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 provides a schematic diagram of an example system 100 for generating a claim classification for a claim data object 105, where the claim classification of the claim data object 105 may be indicative of an emergent classification of the claim data object 105 and future classification-based actions to be performed on the claim data object 105. A claim data object 105 is configured to describe a medical encounter between a healthcare provider and a patient, and in the various embodiments provided herein, the medical encounter occurred in an emergent setting (e.g., an emergency department or emergency room of a hospital). The claim data object 105 is subjected to a multi-dimensional evaluation to determine whether the claim data object 105 and the medical encounter are emergent in nature and warranted the medical encounter occurring in the emergent setting.

The claim data object 105 may be in the form of and/or may be based at least in part on an industry standard Uniform Bill (UB) 04, also known as CMS-1450 or the electronic equivalent of the UB-04 (an EDI 837I). In various embodiments, the claim data object 105 comprises a plurality of code portions, each configured to describe a dimension or aspect of the medical encounter. For instance, an example claim data object 105 comprises at least a first patient dimension code portion, a second patient dimension code portion, a first provider dimension code portion, a second provider dimension code portion, and a third provider dimension code portion. In an example embodiment, the first patient dimension code portion comprises, contains, stores, is associated with, and/or the like one or more first patient dimension code character strings that describe the external cause or mechanism of the patient's injury that prompted the medical encounter. In an example embodiment, the second patient dimension code portion comprises, contains, stores, is associated with, and/or the like one or more second patient dimension code character strings that describe the patient's reason for visit or the patient's reason for the medical encounter. In an example embodiment, the first provider dimension code portion comprises, contains, stores, is associated with, and/or the like one or more first provider dimension code character strings that describe a primary diagnosis in the healthcare provider's perspective of the patient's medical condition. In an example embodiment, the second provider dimension code portion comprises, contains, stores, is associated with, and/or the like one or more second provider dimension code character strings that describe the procedures performed by the healthcare provider during the medical encounter. In an example embodiment, the third provider dimension code portion comprises, contains, stores, is associated with, and/or the like one or more third provider dimension code character strings that describe secondary diagnoses in the healthcare provider's perspective of underlying conditions or comorbidities of the patient.

The system 100 may comprise entities of a variety of parties, including one or more healthcare provider entities. A healthcare provider entity may be a medical institution that provides emergency services, emergency medicine, and/or the like. For example, the healthcare provider entity is a hospital, urgent care center, emergency department clinic, and/or the like. A healthcare provider entity or third party entity may generate one or more claim data objects 105 for a visit and/or generate data values and data objects (e.g., code character strings) within a claim data object 105. The healthcare provider entity may be associated with at least one computing entity, which will be referred to herein as a provider computing entity 104. For example, the provider computing entity 104 generates a claim data object 105.

The system 100 further comprises one or more payer entities. The provider computing entity 104 may provide the claim data object 105 to a payer entity via a network 101. A payer entity may be an entity responsible or under some obligation to pay for some or all of the medical encounter and emergency treatment provided to the patient. However, a payer entity may pay at a lower level (e.g., pay an amount less than a requested amount) or decline to pay if the claim data object 105 is non-emergent and describes a non-emergent medical encounter or non-emergent treatment. As such, various embodiments provide a solution by evaluating the classification of the claim data object (e.g., emergent or non-emergent) 105 and providing an indication of the classification. Each payer entity may be associated with one or more computing entities, which will be referred to herein as a payer computing entity 106. In the illustrated embodiment, the system 100 comprises two payer computing entities 106, each associated with a payer entity. A payer computing entity 106 is configured to receive a claim data object 105 from the provider computing entity 104 via the network 101. The network 101 may be a wired or wireless network (e.g., the Internet, a local area network, and/or the like). In an example embodiment, a payer computing entity 106 generates a claim data object 105 and/or data values and data objects within a claim data object 105 based at least in part on information and data received from the provider computing entity 104.

The system 100 further comprises one or more system computing entities 102. The one or more system computing entities 102 are configured to perform various methods, operations, functions, and/or the like described herein for determining the emergent classification of a claim data object 105, assigning a claim classification to the claim data object 105, and/or performing at least one classification-based action. In various embodiments, the payer entity desires an evaluation of the claim data object 105, and the payer computing entity 106 provides the claim data object 105 to one or more system computing entities 102. In an example embodiment, the provider entity desires an evaluation of the claim data object 105 prior to submitting the claim data object 105 to the payer entity, and the provider computing entity 104 provides the claim data object 105 to one or more system computing entities 102. The one or more system computing entities 102 may be configured in a cloud-based computer architecture sharing and allocating computing and processing resources and data over a network (e.g., network 101).

Exemplary Computing Entities

In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

FIG. 2 provides a schematic of an example system computing entity 102, according to one embodiment of the present disclosure. As shown in FIG. 2, in one embodiment, the system computing entity 102 may include, or be in communication with, one or more processing elements 205 (also referred to as processors, processing circuitry, and/or similar terms used herein interchangeably) that communicate with other elements within the system computing entity 102 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the system computing entity 102 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the system computing entity 102 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the system computing entity 102 with the assistance of the processing element 205 and operating system.

As indicated, in one embodiment, the system computing entity 102 may also include one or more network interfaces 220 for communicating with various computing entities (e.g., one or more other system computing entities 102), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system computing entity 102 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the system computing entity 102 may include, or be in communication with, one or more input elements, such as a keyboard input, a mouse input, a touch screen/display input, motion input, movement input, audio input, pointing device input, joystick input, keypad input, and/or the like. The system computing entity 102 may also include, or be in communication with, one or more output elements (not shown), such as audio output, video output, screen/display output, motion output, movement output, and/or the like.

FIG. 3 provides a schematic of another example system computing entity 102, according to another embodiment of the present disclosure. System computing entities 102 can be operated by various parties, and the system 100 may include one or more system computing entities 102. As shown in FIG. 3, the system computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the system computing entity 102 may be capable of operating with one or more air interface standards, communication protocols, modulation types, and access types. More particularly, the system computing entity 102 may operate in accordance with any of a number of wireless communication standards and protocols, such as those described above with regard to the example system computing entity 102 illustrated in FIG. 2. In a particular embodiment, the system computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the system computing entity 102 may operate in accordance with multiple wired communication standards and protocols, such as those described above with regard to the example system computing entity 102 provided by FIG. 2 via a network interface 226.

Via these communication standards and protocols, the system computing entity 102 can communicate with various other entities (e.g., other system computing entities 102) using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The system computing entity 102 can also download changes, add-ons, and updates, for instance, to its firmware, software (e.g., including executable instructions, applications, program modules), and operating system.

According to one embodiment, the system computing entity 102 may include location determining aspects, devices, modules, functionalities, and/or similar words used herein interchangeably. For example, the system computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the system computing entity's 102 position in connection with a variety of other systems, including cellular towers, Wi-Fi access points, and/or the like. Similarly, the system computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including radio-frequency identification (RFID) tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The system computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the system computing entity 102 to interact with and/or cause display of information/data from the one or more other system computing entities 102, a provider computing entity 104, and/or a payer computing entity 106, as described herein. The user input interface can comprise any of a number of devices or interfaces allowing the system computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the system computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The system computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the system computing entity 102. As indicated, this may include a user application that is resident on the entity or accessible through a browser or other user interface for communicating with one or more other system computing entities 102 and/or various other computing entities (e.g., provider computing entity 104, payer computing entity 106).

In another embodiment, the system computing entity 102 may include one or more components or functionality that are the same or similar to those of the example system computing entity 102 described in greater detail above in context of FIG. 2. As will be recognized, these architectures and descriptions are provided for exemplary purposes only and are not limiting to the various embodiments.

In various embodiments, the system computing entity 102 may be embodied as an artificial intelligence (AI) computing entity, such as an Amazon Echo, Amazon Echo Dot, Amazon Show, Google Home, and/or the like. Accordingly, the system computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

Various embodiments of the present disclosure address technical challenges related to performing a multi-dimensional evaluation of a data object to classify the same (e.g., as emergent or non-emergent). For example, the data object is a claim data object 105. The claim data object 105 may be evaluated with respect to at least five dimensions of an encounter. For example, the claim data object 105 may be evaluated with respect to at least one dimension relating to a patient's perspective of, or a patient's contribution to a medical encounter and at least one dimension relating to a healthcare provider entity's perspective of, or a provider entity's contribution to a medical encounter. In various embodiments, the following methods, operations, functions, and/or the like are performed by one or more system computing entities 102 (or other appropriate computing entities). In an example embodiment, a payer computing entity 106 and/or a provider computing entity 104 may be configured to perform at least a portion of the various methods, operations, functions, and/or the like described herein.

FIG. 4 provides a flowchart diagram of an example process 400 for generating a classification for a data object and performing at least one classification-based action, according to an embodiment of the present disclosure. For example, process 400 may be performed to at least generate a claim classification for a claim data object 105. The claim classification may be indicative of an emergent classification or a non-emergent classification of the claim data object 105 (e.g., binary indication of emergent or non-emergent, scaled indication of an emergent degree, level, or magnitude). Process 400 may be performed by a system computing entity 102, and the system computing entity 102 comprises means, such as processing elements 205, 308, memories 210, 215, 322, 324, network interfaces 220, 326, and/or the like for performing each operation of the process 400. In an example embodiment, process 400 may be performed by a payer computing entity 106 and/or a provider computing entity 104.

The process 400 begins at operation 401, which comprises receiving a claim data object 105. The claim data object 105 comprises a plurality of code portions, each code portion corresponding to a dimension of a medical encounter. For example, a first patient dimension code portion of the claim data object 105 corresponds to a first patient dimension of the medical encounter relating to the external cause or mechanism of the patient's injury. In various embodiments, the system computing entity 102 receives (e.g., via network interfaces 220, 236) the claim data object 105 from a payer computing entity 106. For example, the system computing entity 102 receives a system Application Programming Interface (API) call comprising the claim data object 105 from a payer computing entity 106 via a network 101. In other example embodiments, the system computing entity 102 is associated with the payer entity (e.g., the payer computing entity 106 is and/or comprises the system computing entity 102) and receives the claim data object 105 from a provider computing entity 104. In another example embodiment, the system 100 comprises a database storing claim data objects 105, and the system computing entity 102 retrieves a claim data object 105 from the database. In further example embodiments, the system computing entity 102 is configured to generate a claim data object 105 based at least in part on information and data received from a provider computing entity 104.

The process 400 continues to operation 402, which comprises processing the claim data object 105. The claim data object 105 is processed to extract at least a plurality of code character strings, and each code character string is extracted from a code portion of the claim data object 105. As such, each code character string is associated with, or corresponds to, a dimension of the medical encounter. Continuing the prior example, a code character string extracted from a first patient dimension code portion of the claim data object 105 describes the medical encounter in the first patient dimension, the first patient dimension being the external cause or mechanism of the patient's injury, for example.

In an example embodiment, the extracted plurality of code character strings comprises (i) one or more first patient dimension code character strings extracted from a first patient dimension code portion of the claim data object 105, (ii) one or more second patient dimension code character strings extracted from a second patient dimension code portion of the claim data object 105, (iii) one or more first provider dimension code character strings extracted from a first provider dimension code portion of the claim data object 105, (iv) one or more second provider dimension code character strings extracted from a second provider dimension code portion of the claim data object 105, and (v) one or more third provider dimension code character strings extracted from a third provider dimension code portion of the claim data object 105.

In various embodiments, the claim data object 105 comprises further data objects (e.g., other code character strings). The claim data object 105 may comprise data objects describing the patient, such as demographic data objects including age values, gender data objects, and/or the like. The claim data object 105 may also comprise data objects describing metadata or other information, such as the type of claim (e.g., inpatient, outpatient), revenue codes, charges related to various procedures, and/or the like. In an example embodiment, the claim data object 105 is an electronically-stored UB-04 bill, or an EDI 837I form, and comprises data objects satisfying UB-04 standardized requirements.

In various embodiments, the system computing entity 102 is configured to extract data objects (e.g., code character strings) from the claim data object 105 using various methods, operations, functions, and/or the like. For example, the claim data object 105 may be a data structure (e.g., array, matrix, and/or the like), and the data objects are extracted from corresponding fields, indexes, or code portions of the claim data object 105 (e.g., in memories 210, 215, 322, 324). In other various embodiments, the claim data object 105 may be an electronically-stored UB-04 form, a text-based form, a text document, a flat file, and/or the like, and the system computing entity 102 is configured to perform parsing, processing, and extraction operations to extract numerical and textual characters, categorical data, and/or the like from corresponding code portions of the claim data object 105.

The process 400 may continue to operation 403, which comprises generating, determining, assigning, and similar words used herein interchangeably a claim classification for the claim data object 105. The claim classification is generated based at least in part on a multi-dimensional evaluation of the extracted plurality of code character strings with respect to at least one dimension relating to the patient's perspective of or the patient's contribution to the medical encounter and at least one dimension relating to the healthcare provider entity's perspective of, or the provider entity's contribution to the medical encounter. In various embodiments, system computing entity 102 generates a claim classification by performing one or more automated multi-dimensional evaluation steps/operations. For example, FIGS. 5A-C and FIGS. 6-10 provide example processes for generating a claim classification for the claim data object 105. In an example embodiment, the example processes 500, 600, 700, 800, 900, and 1000 are performed sequentially, with the process 500 being first performed. However, it will be understood that in other example embodiments, the example processes for generating a claim classification for the claim data object 105 may be performed in any order, performed selectively (e.g., perform a subset of the example processes), and/or any such variation. As is illustrated in FIGS. 5A-C and FIGS. 6-10, processes 600, 700, 800, 900, and 100 may be performed as a result of and/or responsive to some condition being satisfied (or not satisfied) in a previously performed process.

Exclusion Evaluation Level

Thus, in an example embodiment, system computing entity 102 first performs process 500. Process 500 generally may be directed to identifying claim data objects 105 that should be excluded from further processing, and claim data objects 105 that may involve certain special circumstances that are considered emergent. Thus, process 500 may cause a claim data object 105 to either be assigned a first classification (e.g., emergent classification), indicating that the claim data object 105 is emergent in nature or is emergent to a first degree, level, or magnitude, or be evaluated at least by a first dimension evaluation level. In various embodiments, system computing entity 102 performs process 500 of identifying claim data objects 105 that are to be excludes from further processing. In another example embodiment, payer computing entity 106 performs process 500 to determine whether a claim data object 105 should be excluded from evaluation prior to providing the claim data object 105 to a system computing entity 102 for evaluation.

Referring first to FIG. 5A, process 500 begins at operation 501. Operation 501 comprises determining whether the claim data object 105 comprises an "outpatient" bill type data object. In various embodiments, a bill type data object is extracted from the claim data object along with the extracted plurality of code character strings, and the system computing entity 102 determines whether an extracted bill type data object comprises an "outpatient" value or otherwise indicates that the bill type of the claim data object 105 is "outpatient." For instance, the claim data object 105 comprises a bill type code character string. A bill type code character string may be any of a set of numerical values classifying the medical encounter. An example bill type code character string with the value "0111" may indicate that the medical encounter was a hospital inpatient visit, while the value "0131" may indicate that the medical encounter was a hospital outpatient visit. According to standard coding conventions (e.g., coding convention for UB-04 bills, National Uniform Billing Committee, Centers for Medicare & Medicaid Services, Department of Health & Human Services), a bill type code character string may be a four-digit numerical value, where the third digit being a "3" signifies an outpatient visit (e.g., 0131). Thus, determining whether the claim data object comprises an "outpatient" bill type data object comprises extracting a bill type data object and processing the digits of the bill type code character string.

If the claim data object does not comprise an "outpatient" bill type data object, then the claim data object 105 may be processed and evaluated at the first dimension evaluation level. For example, process 500 may exit, and process 600 provided by FIG. 6 may be subsequently performed. However, if the claim data object comprises an "outpatient" bill type data object, then operation 502 may be performed.

Operation 502 comprises generating and submitting a query comprising one or more first exclusion dimension code character strings to a first exclusion dimension code datastore. In various embodiments, the one or more first exclusion dimension code character strings may comprise one or more revenue code character strings. Revenue code character strings are configured to describe and identify specific facility, accommodation, and/or ancillary charges to be paid by the payer entity. In various embodiments, the one or more first exclusion dimension code character strings may additionally or alternatively comprise one or more procedure charge code character strings. Procedure charge code character strings are configured to describe various procedures performed during the medical encounter to be paid for by the payer entity. For example, procedure charge code character strings may be CPT codes. In various embodiments, the query may be a datastore API call comprising the one or more first exclusion dimension code character strings to the first exclusion dimension datastore.

The first exclusion dimension code datastore may comprise one or more tables of first exclusion dimension reference values. For example, the first exclusion dimension code datastore comprises or has access to a table of revenue code reference values describing charges associated with an emergency department and a table of procedure charge code reference values describing procedures associated with an emergency department. In various embodiments, revenue code reference values and procedure charge code reference values are stored in the same table.

Operation 503 may then follow operation 502. Operation 503 comprises receiving a query response from the first exclusion dimension datastore. A query response from the first exclusion dimension datastore may indicate and/or comprise an indication of whether at least one first exclusion dimension code character strings is present. A first exclusion dimension code character string is present by being substantially similar or matching a revenue code or procedure charge code reference value stored in the first exclusion dimension code datastore. The query response may be a datastore API response in response to the prior datastore API call, in various embodiments.

Operation 504 may then comprise determining whether the query response indicates that at least one first exclusion dimension code character string is present. If the query response from the first exclusion dimension datastore indicates that no first exclusion dimension code character strings are present, then the process 500 may exit, and the claim data object 105 may undergo a multi-dimensional evaluation beginning with the first dimension evaluation level, as provided by process 600 in FIG. 6.

Otherwise, operation 505 may be performed. Referring now to FIG. 5B, operation 505 comprises determining whether the patient age satisfies a threshold age. In various embodiments, operation 505 determines whether the patient age is less than the threshold age. In various embodiments, the claim data object 105 comprises a patient age data object describing the age of the patient. In other embodiments, determining whether the patient age is less than a threshold age may comprise extracting and processing a patient identifier data object of the claim data object (e.g., social security number, name, birthdate) to first determine the patient age and then compare the determined patient age with a threshold age.

If the patient age satisfies a threshold age, operation 510 may be performed. Operation 510 comprises assigning a first classification (e.g., emergent classification) to the claim data object 105. As discussed, a first classification (e.g., emergent classification) may indicate that the claim data object 105 is emergent, or is emergent to a first degree, level, or magnitude. Thus, a medical encounter involving a young age patient in an emergent setting may be assigned a first classification (e.g., emergent classification) and excluded from the multi-dimensional evaluation. For example, the threshold age is 2 years old, and a medical encounter in an emergent setting with a patient less than 2 years old, with an "outpatient" bill type, and with a recognized first exclusion dimension code character string is assigned a first classification (e.g., emergent classification) and excluded from further evaluation.

Otherwise, operation 506 may be performed. Operation 506 comprises determining whether the claim data object 105 comprises an "exempt" discharge status code character string. In various embodiments, a discharge status code character string is a two-digit code or value indicating the discharge status of the patient, such as to where the patient was discharged. The discharge status code character string may be processed to determine whether the discharge status code character string describes a discharge event that is exempt from further processing or considered to be emergent. For example, a discharge status code character string with the value 20 may describe that the patient expired and deceased in the care of the healthcare provider entity, which may be considered an exempt discharge event. Thus, determining whether the claim data object 105 comprises an "exempt" discharge status code character string may comprise processing a discharge status code character string.

If the claim data object 105 comprises an "exempt" discharge status code character string, operation 510 may be performed, which again comprises assigning a first classification (e.g., emergent classification) to the claim data object 105. A first classification (e.g., emergent classification) may indicate that the claim data object 105 is emergent, or is emergent to a first degree, level, or magnitude. Thus, for example, a claim data object 105 comprising a discharge status code character string describing that the patient expired, an "outpatient" bill type data object, and a recognized first exclusion dimension data object is assigned a first classification (e.g., emergent classification) and excluded from further evaluation.

Otherwise, operation 507 may be performed. Operation 507 comprises determining whether an encounter time period satisfies a threshold time period value. In various embodiments, the claim data object 105 comprises a beginning date data object and an end date data objects, which may both be processed to determine a length of the encounter or an encounter time period. In another example embodiment, the claim data object 105 comprises an encounter time period data object.

If the encounter time period satisfies a threshold time period value, then operation 510 may be performed, which comprises assigning a first classification (e.g., emergent classification) to the claim data object 105. In various embodiments, the threshold time period value is two days, and as such, a claim data object 105 describing a medical encounter that took place over a time period satisfies two days, with an "outpatient" bill type and a recognized first exclusion dimension code character string is assigned a first classification (e.g., emergent classification) and excluded from further evaluation.

Otherwise, operation 508 may be performed. Operation 508 comprises determining whether the claim data object 105 comprises an "observation" revenue code character string. As aforementioned, revenue code character strings are configured to describe and identify specific facility, accommodation, and/or ancillary charges to be paid by the payer entity. Some revenue code character strings may describe observation charges for observation of the patient and may be classified as "observation" revenue code character strings. For example, revenue code character strings with the value 0762 describe charges for the specialty services of observation hours. Thus, one or more revenue code character strings are processed to determine whether the claim data object 105 comprises a revenue code character string that may be classified as "observation" revenue code character string.

If the claim data object 105 comprises an "observation" revenue code character string, operation 510 may be performed, which as previously described, comprises assigning a first classification (e.g., emergent classification) to the claim data object 105. For instance, a claim data object 105 comprising an "observation" revenue code character string describing an observation charge with an "outpatient" bill type and a recognized first exclusion dimension code character strings is assigned a first classification (e.g., emergent classification) and excluded from further evaluation.

Otherwise, operation 509 may be performed. Operation 509 comprises determining whether the claim data object comprises at least one second patient dimension code character string. A second patient dimension code character string may describe the medical encounter in the second patient dimension relating to the patient's reason for visit or for initiating the medical encounter. For example, the second patient dimension code character string may be and/or comprise an ICD code describing a patient's reason for visit. However, if the claim data object 105 does not comprise at least one second patient dimension code character string describing a patient's reason for visit, then operation 510 may be performed, and a first classification (e.g., emergent classification) is assigned to the claim data object 105. For example, operation 510 may be performed, and the claim data object 105 may be excluded from multi-dimensional evaluation, due to the lack of second patient dimension information. Subsequent to operation 510, the process 500 may exit, and returning to process 400, operation 404 may be performed. Operation 404 comprises performing a classification-based action based at least in part on the now-assigned first classification (e.g., emergent classification) of the claim data object 105.

Otherwise, if the claim data object 105 comprises at least one second patient dimension code character string, operation 511 may be performed. Reference is now made to FIG. 5C. Operation 511 comprises generating and submitting a query comprising a first provider dimension code character string, one or more second provider dimension code character strings, and one or more third provider dimension code character strings to a second exclusion dimension datastore. In various embodiments, a first provider dimension relates to a primary diagnosis made by the healthcare provider entity during the medical encounter, a second provider dimension relates to procedures performed by the healthcare provider entity during the medical encounter, and a third provider dimension relates to secondary diagnoses made by the healthcare provider entity during the medical encounter. Then, a first provider dimension code character string may be and/or comprise an ICD code describing a primary diagnosis, a second provider dimension code character string may be and/or comprise a CPT code describing a procedure performed, and a third provider dimension code character string may be and/or comprise an ICD code describing a secondary diagnosis or comorbidity. The generated and submitted query may be a datastore API call to the second exclusion dimension datastore.

The second exclusion dimension datastore may comprise a plurality of second exclusion dimension reference values that describe primary diagnoses, procedures, and secondary diagnoses that are emergent and/or describe special circumstances or conditions that exclude the claim data object 105 from a multi-dimensional evaluation. For example, FIG. 11 illustrates a portion of an example second exclusion dimension table 1100 comprising second exclusion dimension reference values 1102 with associated descriptions 1104 that describe procedures that are emergent and/or are special procedures that exclude the claim data object 105 from further processing in a multi-dimensional evaluation and from being potentially assigned a second classification (e.g., non-emergent classification). An example second exclusion dimension reference value 1102 is the CPT code U0001 describing a procedure for performing the CDC 2019 Novel Coronavirus (COVID-19) Diagnostic Panel. Another example second exclusion dimension reference value 1102 is the CPT code 99292 describing critical care. The second exclusion dimension datastore may further comprise various second exclusion dimension reference values 1102 that are ICD codes describing emergent or special primary diagnoses and/or secondary diagnoses.

Operation 512 may then follow operation 511. Operation 512 comprises receiving a query response from the second exclusion dimension datastore. The query response may be a datastore API response in response to the prior datastore API call. The query response indicates and/or comprises an indication of whether at least one provider dimension code character string (e.g., a first provider dimension code character string, a second provider dimension code character string, a third provider dimension code character string) is present. For example, a second provider code character string of a claim data object 105 may be present or recognized if it is and/or comprises the CPT code U0001, due to the CPT code U0001 being a second exclusion dimension reference value 1102 in the second exclusion dimension datastore.

Operation 513 may then follow operation 512. Operation 513 comprises determining whether the query response indicates that at least one provider dimension code character string is present. If none of the first provider dimension code character string, second provider dimension code character strings, or third provider dimension code character strings are present or recognized, the claim data object 105 is then a candidate for a multi-dimensional evaluation and proceeds to be processed at the first dimension evaluation level, as provided by process 600 in FIG. 6.

On the other hand, operation 517 may be performed if at least one provider dimension code character string is present. Operation 517 comprises assigning a first classification (e.g., emergent classification) to the claim data object. For example, a claim data object 105 that comprises a second provider dimension code character string comprising the CPT code U0001 describing a COVID-19 Diagnostic Panel may be assigned a first classification (e.g., emergent classification) and excluded from multi-dimensional evaluation. That is, the procedure of administering a COVID-19 Diagnostic Panel may be determined to be a special circumstance that is exempt or excluded from potentially being assigned a second classification (e.g., non-emergent classification). Likewise, a claim data object 105 that comprises the CPT code 99292 describing critical care may be determined to be exempt or excluded from multi-dimensional evaluation and determining to be emergent in nature. In various embodiments, assigning a first classification (e.g., emergent classification) to the claim data object at operation 517 in process 500 comprises assigning an exclusion dimension flag, which may be a data entity comprising a code "NEFAIc" and a text string "The claim is excluded from the non-emergent logic."

Subsequent to operation 517, the process 500 may exit, and returning to process 400, operation 404 may be performed. Operation 404 comprises performing a classification-based action based at least in part on the now-assigned first classification (e.g., emergent classification) of the claim data object 105. Thus, once being assigned a first classification (e.g., emergent classification) in process 500, a claim data object is not processed further at a first, second, third, fourth, or fifth dimension evaluation level.

First Dimension Evaluation Level

Referring now to FIG. 6, an example process 600 performed at a first dimension evaluation level is provided. In an example embodiment, the first dimension evaluation level is directed to evaluating the claim data object 105—or data objects (e.g., code character strings) of the claim data object 105—in a first patient dimension relating to an external cause or mechanism of the patient's injury. Specifically, the first dimension evaluation level may determine whether the external cause or mechanism of the patient's injury denotes an emergent care need (e.g., necessitates an emergent medical encounter in an emergent setting).

The example process 600 may be performed subsequent to and/or as a result of various conditions in process 500. For example, the example process 600 may be performed if the claim data object 105 does not comprise an "outpatient" bill type code character string. As another example, the process 600 may be performed if the claim data object 105 comprises no first exclusion dimension code character strings that are present in or recognized by the first exclusion dimension datastore. However, it may be appreciated that, in various other embodiments, process 600 may be performed subsequent to and/or as a result of various conditions being satisfied or unsatisfied in other processes relating to other dimension evaluation levels.

The example process 600 begins at operation 601, which comprises receiving a first patient dimension code character string corresponding to a first patient dimension code portion of the claim data object 105. In an example embodiment, the system computing entity 102 receives, accesses, retrieves, and/or the like a first patient dimension code character string from memories 210, 215. For example, the extracted plurality of code character strings comprises one or more first patient dimension code character strings.

In various embodiments, the first patient dimension code character string is and/or comprises an ICD code describing an external cause or mechanism of the patient injury prompting the medical encounter. As a non-limiting example, a first patient dimension code character string comprising an ICD code Y9232 describes that the external cause of the patient's injury occurred on an athletic field. As another example, a patient's injury is neck pain, and the first patient dimension code character string comprises an ICD code describing a car accident as the external cause or mechanism of neck pain. As yet a further example, a patient's injury is neck pain, and the first patient dimension code character string comprises an ICD code describing sleeping position as the external cause or mechanism of neck pain.

In various embodiments, a first patient dimension code character string may not be received, and instead process 700 provided by FIG. 7 may be performed. For example, a first patient dimension code character string is not received due to the claim data object 105 not comprising a first patient dimension code character string.

The process 600 may continue to operation 602, which comprises determining whether the first patient dimension code character string comprises a specific pre-determined character. ICD codes are various numbers that are categorized, and the numbers of each code are preceded by a character based at least in part on the categorization. ICD codes beginning with the character "S" or "T" describe injuries, poisonings, and certain other consequences of external causes, and ICD codes beginning with the character "X" or "Y" describe external causes of morbidity. Thus, in an example embodiment, the system computing entity 102 may determine whether the first patient dimension code character string comprises an ICD code beginning with the characters "S," "T," "X," or "Y," indicating that the ICD code describes an external cause or mechanism of the patient injury and corresponds to the first patient dimension. On the other hand, an ICD code that does not comprise the characters "S," "T," "X," or "Y" may not be configured to adequately describe an external cause or mechanism of injury. As illustrated in FIG. 6, the system computing entity 102 may proceed to process 700 in FIG. 7 if the first patient dimension code character string, or an ICD code of the first patient dimension code character string, does not comprise such pre-determined characters. It may be appreciated that, in various embodiments, other, additional, or fewer pre-determined characters may be used and checked for in the first patient dimension code character string.

Otherwise, process 600 continues to operation 603, which comprises generating and submitting a query comprising the first patient dimension code character string to a first patient dimension datastore. For example, the system computing entity 102 generates a query in memory 210 and transmits the query via network interface 220 such that the first patient dimension datastore receives the query. For example, the query may be a datastore API call comprising the first patient dimension code character string for the first patient dimension datastore. As another example, the system computing entity 102 comprises the first patient dimension datastore and provides a query comprising the first patient dimension code character string to the first patient dimension datastore. As yet another example, a payer computing entity 106 generates and submits a query comprising the first patient dimension code character string such that a system computing entity 102 comprising the first patient dimension datastore receives the query (e.g., via network interface 220, 326).

In various embodiments, the first patient dimension datastore comprises first patient dimension reference values (e.g., ICD codes) describing non-emergent external causes or mechanisms of injury. The first patient dimension datastore may comprise one or more tables of ICD codes similar to the first patient dimension table 1200 provided by FIG. 12, each first patient dimension table 1200 comprising a plurality of first patient dimension reference values 1202 (e.g., ICD codes). A first patient dimension table 1200 may further comprise descriptions 1204 of non-emergent external causes or mechanisms of injury corresponding to each first patient dimension reference value 1202. As seen in the illustrated first patient dimension table 1200, the first patient dimension ICD codes begin with the characters "S," "T," "X," or "Y," indicating that the first patient dimension reference values 1202 (e.g., ICD codes) relate to an external cause or mechanism of the patient injury.

The first patient dimension reference values 1202 stored by the first patient dimension datastore may be generated, managed, modified, and/or the like by one or more payer entities. For example, a payer entity may determine which external causes or mechanisms of injury are to be considered non-emergent. The first patient dimension datastore may store one or more first patient dimension tables 1200 for one or more payer entities, where each first patient dimension table 1200 corresponding to a payer entity may store different first patient dimension reference values. As such, the query generated and submitted by the system computing entity 102 may identify a payer entity requesting the evaluation of the claim data object 105. For example, a generated and submitted datastore API call may further comprise a payer identifier such that the datastore API call may be transmitted or forwarded to the first patient dimension table 1200 corresponding to the payer computing entity 106 providing the claim data object 105. In various embodiments, the first patient dimension datastore comprises a default first patient dimension table 1200 comprising a plurality of first patient dimension reference values 1202 describing non-emergent external causes or mechanisms of patient injury and generally used by one or more payer entities.

In an example embodiment, the first patient dimension reference values 1202 describing non-emergent external causes or mechanism of injury are generated, managed, modified, and/or the like using machine learning methods. The first patient dimension datastore may be trained in a supervised manner with claim data objects 105 previously determined to be emergent or non-emergent, and the first patient dimension datastore may learn of, through supervised machine learning methods, common first patient dimension code character strings describing non-emergent external causes or mechanisms of injury. Then, for example, first patient dimension reference values 1202 corresponding to the ICD codes of the common first patient dimension code character strings may be added to the first patient dimension datastore.

The process may continue to operation 604, which comprises receiving a query response from the first patient dimension datastore. For example, the system computing entity 102 receives (e.g., via network interface 220, 326) a datastore API response from the first patient dimension datastore in response to the prior datastore API call. The query response may indicate and/or comprise an indication whether the first patient dimension code character string is present, or is substantially similar to a first patient dimension reference value 1202. Continuing the prior example of a first patient dimension code character string comprising the ICD code Y9232, the received query response from the first patient dimension datastore comprising the example first patient dimension table 1200 may indicate that the ICD code Y9232 is, in fact, a first patient dimension reference value 1202 stored in the first patient dimension table 1200. For example, a payer computing entity 106 may have configured the first patient dimension table 1200 to comprise the first patient dimension reference value of Y9232 due to the payer entity deeming that an external cause occurring on an athletic field is non-emergent, or not indicative of an emergent need.

On the other hand, the query response may comprise an indication that the first patient dimension code character string is not present or not recognized if the first patient dimension code character string comprises an ICD code that is not in a first patient dimension table 1200 and thereby deemed to describe an emergent external cause or mechanism of injury. In various embodiments, the first patient dimension datastore performs various operations or functions to determine whether the first patient dimension code character string is present, or comprises an ICD code substantially similar to a first patient dimension reference value stored in a first patient dimension table 1200. For example, the first patient dimension datastore performs a search operation (e.g., sequential search, hash search, binary search, and/or the like) on the first patient dimension table 1200, or a first patient dimension table 1200 corresponding to the payer entity. In another example, the first patient dimension table 1200 is graphically structured, and the first patient dimension datastore performs graph traversal search operations on the first patient dimension table 1200.

Operation 605 may then follow operation 604. Operation 605 comprises determining whether the received query response indicates that the first patient dimension code character string is present by the first patient dimension datastore. If the received query response indicates that the first patient dimension code character string and therefore that the first patient dimension code character string comprises an ICD code describing a non-emergent external cause or mechanism of injury, process 700 provided by FIG. 7 may be performed next. As such, the claim data object 105 is evaluated with respect to a further dimension in process 700. Thus, it may be appreciated that a second classification (e.g., non-emergent classification) is not yet assigned to the claim data object 105 in process 600 based solely on an evaluation with respect to the first patient dimension.

Otherwise, operation 606 may be performed. Operation 606 comprises assigning a first patient dimension flag to the claim data object 105. The system computing entity 102 may generate a first patient dimension flag, concatenate the first patient dimension flag, insert the first patient dimension flag, link the first patient dimension flag, and/or the like to the claim data object 105. The first patient dimension flag may indicate that the claim data object 105 is emergent in nature with respect to the first patient dimension specifically. The first patient dimension flag may be a numerical, textual, and/or categorical value. For example, in an example embodiment, the first patient dimension flag comprises a code "NEF1I" and a message "The claim has an injury diagnosis code(s) that is considered to be emergent."

The process 600 may then continue to operation 607. Operation 607 comprises assigning a first claim classification (e.g., emergent) to the claim data object 105. For example, the system computing entity 102 generates, inserts, modifies, and/or the like a claim classification value in the claim data object 105 to indicate a first claim classification (e.g., emergent). The first claim classification (e.g., emergent) may indicate that the claim data object 105 is evaluated to be emergent, while a second claim classification (e.g., non-emergent) may indicate that the claim data object is evaluated to be non-emergent. In various embodiments, a claim classification of various values, levels, ranges may be assigned to the claim data object 105. For example, a first claim classification (e.g., emergent) may then indicate that the claim data object 105 is emergent to a first degree, level, or magnitude, while a second may then indicate that the claim data object 105 is emergent to a second degree, level, or magnitude.

Following operation 607, the process 600 may exit, and, returning to process 400 in FIG. 4, operation 404 may be performed. Operation 404 may then comprise performing a classification-based action based at least in part on the now-assigned first claim classification (e.g., emergent) of the claim data object 105. Thus, the claim data object 105 is not evaluated with respect to further dimensions once the claim data object 105 is assigned a first claim classification (e.g., emergent) in process 600, for example. In various embodiments, another first patient dimension code character string is received, and the process 600 may be performed again, following operation 607. For example, a claim data object 105 describing a UB-04 claim form may comprise up to three first patient dimension code character strings describing external causes or mechanisms of the patient's injury or injuries. Thus, the process 600 may be performed for each first patient dimension code character string. In various other embodiments, the query generated and submitted to the first patient dimension code character string comprises more than one first patient dimension code character string, and the query response indicates whether each first patient dimension code character string is present or whether at least one first patient dimension code character string is present.

It may be appreciated then that the first dimension evaluation level is directed to determining the emergent classification of the first patient dimension of the medical encounter, specifically relating to external causes or mechanisms of the patient's injury. As such, various embodiments of the present disclosure consider and evaluate important aspects and data of the medical encounter. For example, a first medical encounter prompted by neck pain associated with a vehicular accident and a second medical encounter prompted by neck pain associated with sleeping position may result in different evaluations due to the different external causes or mechanisms of patient injury in each medical encounter.

Second Dimension Evaluation Level

FIG. 7 provides an example process 700 for the second dimension evaluation level. In an example embodiment, the second dimension evaluation level is directed to evaluating the claim data object 105—or data objects (e.g., code character strings) of the claim data object 105—in a first provider dimension of a medical encounter relating to a primary diagnosis of the patient's medical condition from the perspective or in the opinion of the healthcare provider entity (e.g., emergency department doctors or experts). Specifically, the second dimension evaluation level may determine whether the primary diagnosis of the patient's medical condition bears a moderate to high complexity necessitating the emergent care in the emergent setting.

Process 700 may be performed subsequent to and/or as a result of various conditions in process 600. Specifically, process 700 may be performed as a result of a claim data object 105 not comprising a first patient dimension code character string, a first patient dimension code character string not being received, a first patient dimension code character string not comprising a specific pre-determined character (e.g., an ICD code not beginning with characters "S," "T," "X," or "Y") and/or as a result of the first patient dimension code character string being present in or being recognized by the first patient dimension datastore (e.g., first patient dimension code object describes a non-emergent external cause or mechanism of injury according to the first patient dimension datastore). However, it may be appreciated that, in various other embodiments, process 700 may be performed subsequent to other dimension evaluation levels.

Process 700 may begin at operation 701, which comprises receiving a first provider dimension code character string corresponding to a first provider dimension code portion of the claim data object 105. For example, the system computing entity 102 may receive, access, retrieve, and/or the like the first provider dimension code character string from memory 210 where the first provider dimension code character string was stored after being extracted from the claim data object 105. For example, the extracted plurality of code character strings comprises a first provider dimension code character string.

In various embodiments, the first provider dimension code character string is and/or comprises an ICD code describing a primary diagnosis of the patient's medical made by the healthcare provider entity. During the medical encounter, the healthcare provider entity (e.g., an emergent department doctor or expert) examines the patient and the patient's injury or condition, and determines a primary diagnosis for the patient based at least in part on observed symptoms, vital signs, conditions, and/or the like. As a non-limiting example, a first provider dimension code character string comprising an ICD code A430 describes that the primary diagnosis of the patient's medical condition is pulmonary nocardiosis.

The process 700 may continue to operation 702, which comprises generating and submitting a query comprising the first provider dimension code character string to a first provider dimension datastore. For example, the system computing entity 102 generates a query in memory 324 and transmits the query via network interface 326 such that the first provider dimension datastore receives the query. In various embodiments, the query may be a datastore API call comprising the first provider dimension code character string for the first provider dimension datastore. As another example, the system computing entity 102 comprises the first provider dimension datastore and provides a query comprising the first provider dimension code character string to the first provider dimension datastore. As yet another example, a payer computing entity 106 generates and submits a query comprising the first provider dimension code character string such that a system computing entity 102 comprising the first provider dimension datastore receives the query (e.g., via network interface 220, 326).

Analogous to the first patient dimension datastore, the first provider dimension datastore comprises first provider dimension reference values (e.g., ICD codes) describing non-emergent primary diagnoses. The first provider dimension datastore may comprise one or more first provider dimension tables, such as the example first provider dimension table 1300 provided by FIG. 13, each first provider dimension table 1300 comprising a plurality of first provider dimension reference values 1302 (e.g., ICD codes). A first provider dimension table 1300 may further comprise descriptions 1304 of non-emergent primary diagnoses corresponding to each first provider dimension reference value 1302. Each first provider dimension table 1300 of the first provider dimension datastore corresponds to a payer entity, and may comprise first provider dimension reference values 1302 that the payer entity has deemed to describe non-emergent primary diagnoses. As such, a generated and submitted datastore API call may further comprise a payer identifier such that the datastore API call may be transmitted or forwarded to the first provider dimension table 1300 corresponding to the payer computing entity 106 providing the claim data object 105. First provider dimension reference values 1302 may be further modified using supervised machine learning methods. In various embodiments, the first provider dimension datastore comprises a default first provider dimension table 1300 comprising a plurality of first provider dimension reference values 1302 describing non-emergent primary diagnoses and generally used by one or more payer entities.

Operation 703 may then follow operation 702. Operation 703 comprises receiving a query response from the first provider dimension datastore. For example, system computing entity 102 receives the query response via network interface 220. In various embodiments, the query response is a datastore API response based at least in part on the prior datastore API call generated and submitted by the system computing entity 102 to the first provider dimension datastore.

The query response received from the first provider dimension datastore indicates and/or comprises an indication of whether or not the first provider dimension code character string is present in or recognized by the first provider dimension datastore. The first provider dimension code character string may be present in the first provider dimension datastore by comprising an ICD code substantially similar to a first provider dimension reference value 1302, in various embodiments. For example, the query response indicates whether the first provider dimension code character string comprises an ICD code that is substantially similar to or matches a first provider dimension reference value stored in a first provider dimension table 1300. Returning to the prior example of a first provider dimension code character string comprising the ICD code A430, a query response may indicate that the first provider dimension code character string is present due to the ICD code A430 being a first provider dimension reference value 1302 in the example first provider dimension table 1300 provided by FIG. 13. However, it may be appreciated that a query response may indicate that the first provider dimension code character string is not present if the first provider dimension table 1300 does not store the ICD code A430 as a non-emergent primary diagnosis. In various embodiments, the first provider dimension datastore determines whether the first provider dimension code character string is present by performing one or more query or search operations on a first provider dimension table 1300.

In various embodiments, a first provider dimension table 1300 may comprise a first provider dimension reference value 1302 (e.g., an ICD code) substantially similar to a first patient dimension reference value 1202 (e.g., an ICD code) of a first patient dimension table 1200. For example, an ICD code describing a non-emergent external cause or mechanism of patient injury may also describe a non-emergent primary diagnosis. As an example, a claim data object 105 may store an ICD code S0051 describing "Abrasion of lip and oral cavity" in a code portion corresponding to external case or mechanism of patient injury as well as in a code portion corresponding to primary diagnosis in the opinion of the healthcare provider entity. That is, a healthcare provider entity may make the primary diagnosis that the patient has suffered an abrasion of lip and oral cavity. In an embodiment where both a first patient dimension table 1200 and a first provider dimension table 1300 comprise the ICD code S0051, the claim data object 105 may be determined to be non-emergent with respect to both a first patient dimension and a first provider dimension, for example. However, an ICD code describing a non-emergent external cause or mechanism of patient injury may not describe a non-emergent primary diagnosis. Thus, an ICD code may be evaluated differently as a first patient dimension code character string and as a first provider dimension code character string.

Thus, at operation 704, the computing entity may determine whether the query response indicates that the first provider dimension code character string is present. If the query response indicates that the first provider dimension code character string is in fact present-thereby indicating that the claim data object 105 is evaluated as non-emergent with respect to the first provider dimension, then the process 800 provided by FIG. 8 may be performed next. Thus, the claim data object 105 is evaluated with respect to another dimension if it is determined that the first provider dimension code character string describes a non-emergent primary diagnosis, for example. A second claim classification (e.g., non-emergent) is not yet assigned to the claim data object 105 in process 700, and the claim data object 105 is not yet determined to be non-emergent in nature based at least in part on an evaluation with respect to the first provider dimension.

Otherwise, operation 705 may follow operation 704. Operation 705 comprises assigning a first provider dimension flag to the claim data object 105. The system computing entity 102 may assign the first provider dimension flag to the claim data object 105 by concatenating the first provider dimension flag to the claim data object 105, inserting the first provider dimension flag in the claim data object 105, linking the first provider dimension flag with the claim data object 105, and/or the like. In an example embodiment, the first provider dimension flag comprises a code "NEF2I" and a message "The claim has a principal diagnosis code that is considered emergent."

Operation 706 may then follow operation 705. Operation 706 comprises assigning a first claim classification (e.g., emergent) to the claim data object 105. As previously mentioned, a first claim classification (e.g., emergent) may indicate an emergent classification, and thus assigning a first claim classification (e.g., emergent) to the claim data object 105 may indicate that the claim data object 105 is emergent in nature. As also previously discussed, a claim classification may be a numerical value within a classification range, and a first claim classification (e.g., emergent) assigned to the claim data object 105 may indicate that the claim data object 105 is emergent to a first degree or a first magnitude.

Subsequent to operation 706, the process 700 may exit, and operation 404 of process 400 may be performed. That is, a classification-based action may be performed based at least in part on the now-assigned first claim classification (e.g., emergent) of the claim data object 105. Thus, the claim data object 105 is not evaluated with respect to further dimensions once the claim data object 105 is assigned a first claim classification (e.g., emergent) in process 700, in an example embodiment.

Thus, it may be appreciated that the second dimension evaluation level is directed to determining the emergent classification of the first provider dimension of the medical encounter, specifically relating to the primary diagnosis in the medical encounter. As such, the expert opinion of the healthcare provider entity may be considered in determining the classification of the claim data object (e.g., emergent or non-emergent) 105. Thus, a medical encounter that the healthcare provider entity has diagnosed with a non-emergent primary diagnosis may result in a different evaluation than a medical encounter that the healthcare provider entity has diagnosed with an emergent primary diagnosis.

Third Dimension Evaluation Level

Referring now to FIG. 8, an example process 800 for the third dimension evaluation level is provided. In an example embodiment, the third dimension evaluation level is directed to evaluating the claim data object 105—or data objects of the claim data object 105—in a second provider dimension relating to procedures performed on the patient during the medical encounter. For example, the third dimension evaluation level may determine whether procedures performed on the patient were emergent procedures or procedures necessitating an emergent setting (e.g., an emergency department or an emergency room).

The process 800 may be performed subsequent to and/or as a result of various conditions in process 700. For example, the process 800 may be performed if a query response received from a first provider dimension datastore indicates that a first provider dimension code character string is present by a first provider dimension datastore. That is, evaluation of the claim data object 105 with respect to a second provider dimension as provided by process 800 may be performed as a result of a first provider dimension code character string describing a non-emergent primary diagnosis. However, it may be appreciated that, in various other embodiments, process 800 may be performed subsequent to other dimension evaluation levels.

The process 800 begins with operation 801. Operation 801 comprises receiving one or more second provider dimension code character strings corresponding to a second provider dimension code portion of the claim data object 105. For example, the system computing entity 102 receives, accesses, retrieves, and/or the like one or more second provider dimension code character strings from memories 210, 215. For example, the extracted plurality of code character strings comprises one or more second provider dimension code character strings.

In various embodiments, a second provider dimension code character string is and/or comprises a CPT code describing a procedure performed by the healthcare provider entity on the patient during the medical encounter. For example, a CPT code may describe an antibody screening performed on the patient, X-ray procedures performed on the patient, anesthetics administered to the patient, and/or the like. A claim data object 105 may comprise more than one second provider dimension code character strings when a medical encounter involves more than one procedure being performed on the patient. For example, a claim data object 105 is an electronically-stored UB-04 form and comprises a second provider dimension code portion configured to describe a principal procedure and five other procedures performed on the patient.

The process 800 may continue to operation 802, which comprises classifying each second provider dimension code character string. In various embodiments, the system computing entity 102 is configured to generate and submit a query comprising each second provider dimension code character string to a second provider dimension datastore and receive a query response comprising a classification and/or an indication of a classification for each second provider dimension code character string. In such embodiments, the query and the query response is a datastore API call and response, respectively. In other various embodiments, the system computing entity 102 and/or the payer computing entity 106 is configured to classify and/or determine a classification for each second provider dimension code character string.

Reference is now made to both FIGS. 14A and 14B. FIG. 14A provides a second provider dimension table 1400 comprising a plurality of second provider dimension reference values 1402 with associated descriptions 1404. FIG. 14B provides a second provider dimension classification table 1450 comprising one or more procedure classifications 1406 and associated point values 1408. Each second provider dimension code character string may be classified according to the one or more procedure classifications 1406. For example, the second provider dimension classification table 1450 comprises (i) a lab procedure classification, (ii) a radiology procedure classification, (iii) an advanced procedure classification, (iv) a systemic therapeutics procedure classification, (v) an electrocardiogram (EKG) procedure classification, and (vi) an other or miscellaneous procedure classification. Thus, in an example embodiment, each second provider dimension code character string is classified as one of the procedure classifications 1406.

A second provider dimension code character string may be classified based at least in part on a CPT code. For example, a second provider dimension code character string comprises the CPT code 70480, which as illustrated in the second provider dimension table 1400, describes computed tomography (CT) imaging of the patient's orbit sella, posterior fossa of the patient's skull, or the patient's ear without contrast material. The CPT code 70480 may be substantially similar to a second provider dimension reference value 1402 classified as an advanced procedure classification, and thus, the second provider dimension code character string comprising the CPT code 70480 may be classified with an advanced procedure classification. Indeed, each procedure classification 1406 may be associated with a plurality of second provider dimension reference values 1402, and the second provider dimension code character string may be compared to the pluralities of second provider dimension reference values 1402 associated with one or more procedure classifications 1406 to determine a classification for the second provider dimension code character string.

In another embodiment, a second provider dimension code character string may be classified based at least in part on machine learning methods. For example, a second provider dimension code character string comprises the CPT code 70540, and the associated description 1404 in the second provider dimension table 1400 is parsed, processed, analyzed, and/or the like using text-based machine learning and/or natural language processing methods to determine a classification for the second provider dimension code character string. In another embodiment, the second provider dimension code character string is classified based at least in part on supervised machine learning methods.

Thus, each second provider dimension code character string may be classified according to one or more procedure classifications 1406 in the second provider dimension classification table 1450. In various embodiments, imaging procedures such as magnetic resonance imaging (MRI) and computed tomography (CT) imaging are classified as advanced procedures. In various embodiments, other imaging procedures such as X-ray are classified as radiology procedures. Classification may also be based at least in part on a configuration or standard of procedure classifications from the perspective of a payer entity. For example, a payer entity may deem X-ray imaging procedures to be advanced procedures, and thus, second provider dimension code character strings describing X-ray imaging procedures may be classified as advanced procedures.

Returning to FIG. 8, the process 800 may continue to operation 803. Operation 803 comprises determining an aggregate score based at least in part on the automated classification of each second provider dimension code character string. In various embodiments, the aggregate score is based at least in part on the unique procedure classifications 1406 for which the one or more second provider dimension code character strings are classified. As shown in the second provider dimension classification table 1450, each procedure classification 1406 is associated with a point value 1408. The aggregate score is then a summation of the associated point values 1408 of the unique procedure classifications 1406 present in the one or more second provider dimension code character strings.

As an example, a claim data object 105 comprises two second provider dimension code character strings each classified as EKG procedures and one second provider dimension code character string classified as a lab procedure. Thus, the unique procedure classifications 1406 present in the second provider dimension code character strings are the EKG procedure classification and the lab procedure classification, regardless of the number of second provider dimension code character strings classified as each, or the frequency of each procedure classification 1406. The aggregate score then, in this example, is 200 points, from the sum of the 100 points associated with the EKG procedure classification and the 100 points associated with the lab procedure classification.

As another example, a claim data object 105 comprises five second provider dimension code character strings each classified as advanced procedures. Thus, the aggregate score in this example is 200 points due to the only unique procedure classification 1406 being the advanced procedure classification associated with a point value of 200 points.

Operation 804 may then follow operation 803. Operation 804 comprises determining whether the aggregate score satisfies a threshold score. For example, the aggregate score being greater than or equal to a threshold score indicates that the aggregation of the procedures performed by the healthcare provider entity on the patient during the medical encounter is of high complexity, intensity, or otherwise emergent classification. Likewise, the aggregate score being less than the threshold score may suggest that the procedures performed by the healthcare provider entity on the patient during the medical encounter could have been performed in a lower cost or non-emergent setting.

In an example embodiment, the threshold score is 199 points, and the aggregate score is determined based at least in part on the second provider dimension classification table 1450 provided by FIG. 14B. It may be clear then that an aggregate score for a claim data object 105 comprising one or more second provider dimension code character strings classified as advanced procedures is then 200 points and exceeds the threshold score of 199 points. As such, a medical encounter with at least one advanced procedure automatically qualifies as a high-complexity and emergent medical encounter based at least in part on this evaluation. On the other hand, an aggregate score for a claim data object 105 comprising one or more second provider dimension code character strings classified as systemic therapeutics procedures is then 100 points and does not exceed the threshold score of 199 points, for example. As yet a further example, an aggregate score for a claim data object 105 comprising one or more second provider dimension code character strings classified as lab procedures and one or more second provider dimension code character strings classified as EKG procedures is then 200 points and does exceed the threshold score of 199 points, for example.

If the aggregate score does not exceed the threshold score, then the claim data object 105 may then be evaluated at the next dimension evaluation level. In an example embodiment, the claim data object 105 is evaluated by the example process 900 provided by FIG. 9 if the aggregate score does not exceed the threshold score. Thus, it may be appreciated that a second claim classification (e.g., non-emergent) is not yet assigned to the claim data object 105 based at least in part on an evaluation with respect to the second provider dimension, and the claim data object 105 is evaluated with respect to yet another dimension.

Otherwise, operation 805 may be performed if the aggregate score does exceed the threshold score. Operation 805 comprises assigning a second provider dimension flag to the claim data object 105. For example, the system computing entity 102 may assign the second provider dimension flag to the claim data object 105 by concatenating the second provider dimension flag to the claim data object 105, inserting the second provider dimension flag in the claim data object 105, linking the second provider dimension flag with the claim data object 105, and/or the like. In an example embodiment, the second provider dimension flag is a data entity comprising a code "NEF3I" and a text string "The claim has a CPT category total of satisfies 199 points and is considered emergent."

Operation 806 may then follow operation 805. Operation 806 comprises assigning a first claim classification (e.g., emergent) to the claim data object 105. As aforementioned, a first claim classification (e.g., emergent) may indicate an emergent classification of the claim data object 105. For example, a first claim classification (e.g., emergent) may indicate that the claim data object 105 is emergent, or that the claim data object 105 is emergent to a first emergent degree, level, magnitude, and/or the like.

Subsequent to operation 806 of assigning a first claim classification (e.g., emergent), the process 800 may exit, and operation 404 of operation 400 may be performed where a classification-based action may be performed based at least in part on the first claim classification (e.g., emergent) assigned to the claim data object 105. Indeed, the claim data object 105 may not be evaluated with respect to further dimensions after being assigned a first claim classification (e.g., emergent) as a result of an evaluation with respect to the second provider dimension. Therefore, the third dimension evaluation level is directed to determining the emergent classification of the second provider dimension of the medical encounter, specifically relating to the procedures performed by the healthcare provider entity on the patient during the medical encounter.

Fourth Dimension Evaluation Level

Reference is now made to FIG. 9, where an example process 900 for the fourth dimension evaluation level is provided. In an example embodiment, the fourth dimension evaluation level is directed to evaluating the claim data object 105—or data objects of the claim data object 105—in a third provider dimension relating to secondary diagnoses of the patient's underlying medical conditions or comorbidities from the perspective or in the opinion of the healthcare provider entity (e.g., emergency department doctors or experts). For example, the fourth dimension evaluation level determines whether the patient has a history of illness with an emergent classification.

The process 900 may be performed subsequent to and/or as a result of an evaluation with respect to the second provider dimension. Specifically, the process 900 may be performed based at least in part on determining that an aggregate procedure classification score is less than a threshold procedure classification score. However, it will be understood that, in other various embodiments, the process 900 of evaluating the claim data object 105 with respect to a third provider dimension may be performed subsequent to and/or as a result of various conditions being satisfied or unsatisfied in other dimension evaluation levels.

The process 900 begins with operation 901. Operation 901 comprises receiving a third provider dimension code character string corresponding to a third provider dimension code portion of the claim data object 105. For example, the system computing entity 102 receives, accesses, retrieves, and/or the like one or more third provider dimension code character strings from memories 210, 215. For example, the extracted plurality of code character strings comprises one or more third provider dimension code character strings.

In various embodiments, the third provider dimension code character string is and/or comprises an ICD code describing a secondary diagnosis of the patient's medical condition, a patient's underlying condition, the patient's history of illness, the patient's comorbidities, and/or the like, by the healthcare provider entity. The patient may have a chronic condition such as type 1 diabetes or some form of cancer, and the medical encounter may not necessarily be directly related to the chronic condition, for example. As another example, the healthcare provider entity may determine or make one or more secondary diagnoses, such as dehydration, relative to the primary diagnosis. Such underlying conditions or secondary diagnoses are described by ICD codes (e.g., E10649 describing type 1 diabetes mellitus with hypoglycemia without coma, E860 describing dehydration).

Operation 902 may then follow operation 901. Operation 902 comprises generating and submitting a query comprising the third provider dimension code character string to a third provider dimension datastore. In an example embodiment, the system computing entity 102 generates a query in memory 210 and transmits the query via network interface 220 such that the third provider dimension datastore receives the query. In various embodiments, the query may be a datastore API call comprising the third provider dimension code character string for the third provider dimension datastore. As another example, the system computing entity 102 comprises the third provider dimension datastore and provides a query comprising the third provider dimension code character string to the third provider dimension datastore. As yet another example, a payer computing entity 106 generates and submits a query comprising the third provider dimension code character string such that a system computing entity 102 comprising the third provider dimension datastore receives the query (e.g., via network interface 220, 326).

Similar to previous described dimension datastores, the third provider dimension datastore comprises or stores a plurality of third provider dimension reference values (e.g., ICD codes) describing non-emergent secondary diagnoses or comorbidities. Specifically, the plurality of third provider dimension reference values (e.g., ICD codes) are stored in a third provider dimension table 1500, an example such third provider dimension table 1500 provided by FIG. 15, and the third provider dimension datastore comprises one or more third provider dimension tables 1500. The example third provider dimension table 1500 may comprise third provider dimension reference values 1502 (e.g., ICD code E10649 describing type 1 diabetes mellitus with hypoglycemia without coma, ICD code E860 describing dehydration) with associated descriptions 1504. A third provider dimension table 1500 may store a plurality of third provider dimension reference values 1502 that are determined by a payer entity to describe non-emergent secondary diagnoses. Thus, each third provider dimension table 1500 may correspond to one payer entity and comprises a plurality of third provider dimension reference values 1502 describing secondary diagnoses or comorbidities deemed non-emergent by the payer entity. As such, the generated and submitted datastore API may further comprise a payer identifier such that the datastore API call may be transmitted or forwarded to the third provider dimension table 1500 corresponding to the payer computing entity 106 providing the claim data object 105. The third provider dimension reference values 1502 of a third provider dimension table 1500 may also be modified using supervised machine learning methods. In various embodiments, the third provider dimension datastore comprises a default third provider dimension table 1500 comprising a plurality of third provider dimension reference values 1502 describing non-emergent secondary diagnoses and comorbidities and generally used by one or more payer entities.

Operation 903 may then follow operation 902. Operation 903 comprises receiving a query response from the third provider dimension datastore. For example, system computing entity 102 receives the query response via network interface 220. In various embodiments, the query response is a datastore API response based at least in part on the prior datastore API call generated and submitted by the system computing entity 102 to the third provider dimension datastore.

The query response received from the third provider dimension datastore indicates and/or comprises an indication of whether or not the third provider dimension code character string is present in or recognized by the third provider dimension datastore. A third provider dimension code character string may be present in the third provider dimension datastore by comprising an ICD code that matches a third provider dimension reference value 1502 in the third provider dimension datastore. For example, in response to a query comprising a third provider dimension code character string comprising the ICD code E860, a query response may indicate that the third provider dimension code character string is present and that the ICD code E860 matches a third provider dimension reference value 1502 in a third provider dimension table 1500 and thereby describes a secondary diagnosis or comorbidity that is deemed to be non-emergent. Otherwise, a query response may indicate that the third provider dimension code character string is not present. In various embodiments, the third provider dimension datastore determines whether the third provider dimension code character string is present by performing one or more query or search operations on a third provider dimension table 1500.

In various embodiments, a third provider dimension table 1500 may comprise a third provider dimension reference value 1502 (e.g., an ICD code) substantially similar to a first patient dimension reference value 1202 and/or a first provider dimension reference value 1302. For example, a particular ICD code describing a non-emergent secondary diagnosis or comorbidity may also describe a non-emergent external cause or mechanism of patient injury and/or a non-emergent primary diagnosis. Likewise however, a particular third provider dimension reference value 1502 may be present in one or more other dimension tables (e.g., first patient dimension tables 1200, first provider dimension tables 1300) while being absent in other dimension tables.

As such, a particular ICD code may be evaluated differently as a third provider dimension code character string and as another dimension code character string.

Operation 904 may then follow operation 903. Operation 904 comprises determining whether the query response received from the third provider dimension code datastore indicates that the third provider dimension code character string is present by the third provider dimension code datastore. If the query response indicates that the third provider dimension code character string is present, then the process 1000 provided by FIG. 1000 may be performed next. Therefore, if the third provider dimension code character string describes a secondary diagnosis deemed to be non-emergent, then the claim data object 105 may be evaluated with respect to yet another dimension in process 1000. Thus, it may be appreciated that a second classification (e.g., non-emergent classification) is not yet assigned to the claim data object 105 in process 1000 based at least in part on an evaluation with respect to the third provider dimension.

Otherwise, operation 905 may be performed. Operation 905 comprises assigning a third provider dimension flag to the claim data object 105. The system computing entity 102 may assign the third provider dimension flag to the claim data object 105 by concatenating the third provider dimension flag to the claim data object 105, inserting the third provider dimension flag in the claim data object 105, linking the third provider dimension flag with the claim data object 105, and/or the like. In an example embodiment, the third provider dimension flag comprises a code "NEF4I" and a message "The claim has co-morbidity diagnosis code(s) that is considered emergent."

Operation 906 may then follow operation 905. Operation 906 comprises assigning a first claim classification (e.g., emergent) to the claim data object 105. The first claim classification (e.g., emergent) may indicate that the claim data object 105 has been evaluated to be emergent, and/or the claim data object 105 has been evaluated to be emergent to a first degree, level, or magnitude.

Subsequently, the process 900 may exit, and operation 404 of process 400 may be performed, which comprises performing a classification-based action based at least in part on the generated and now-assigned first claim classification (e.g., emergent) of the claim data object 105. Thus, the claim data object 105 may not be further evaluated with respect to further dimensions subsequent to the claim data object 105 being assigned a first claim classification (e.g., emergent) in process 900, in an example embodiment. In various embodiments, another third provider dimension code character string is received, and the process 900 may be performed again following operation 906. In other embodiments, one or more third provider dimension code character strings may be received in operation 901, and the query response received from the third provider dimension datastore indicates whether each third provider dimension code character string is present or whether at least one third provider dimension code character string is present.

The fourth dimension evaluation level thereby provides an evaluation of the emergent classification of the third provider dimension of the medical encounter, specifically relating to secondary diagnoses and comorbidities of the patient's medical condition, underlying conditions, illness history, and/or the like made by the healthcare provider entity. For example, the fourth dimension evaluation level considers the effect of chronic conditions of the patient. Thus, a patient visiting the healthcare provider entity in an emergent setting and having a chronic condition may result in a different evaluation than another patient visiting the healthcare provider entity without a chronic condition. Likewise, the consideration of comorbidities allows the fourth dimension evaluation level to determine a complexity of the medical encounter. For example, the presence of emergent comorbidities in addition to the primary diagnosis may suggest a high complexity medical encounter necessitating emergent care in an emergent setting.

Fifth Dimension Evaluation Level

FIG. 10 provides an example process 1000 for the fifth dimension evaluation level. In an example embodiment, the fifth dimension evaluation level is directed to evaluating the claim data object 105—or data objects (e.g., code character strings) of the claim data object 105—in a second patient dimension relating to the patient's reason of visit, or a patient perspective of the patient's own medical condition. Thus, the fifth dimension evaluation level may determine whether the patient's chief complaint, as well as other contributing reasons for the patient's decision to utilize the healthcare provider entity in an emergent setting, is emergent.

Process 1000 may be performed subsequent to and/or as a result of various conditions in process 900. For example, process 1000 may be performed if a query response from the third provider dimension datastore indicates that a third provider dimension code character string is present and describe a non-emergent comorbidity or secondary diagnosis. In various other embodiments however, process 1000 may be performed subsequent to and/or as a result of other dimension evaluation levels.

The process 1000 begins with operation 1001. Operation 1001 comprises receiving a second patient dimension code character string corresponding to a second patient dimension code portion of the claim data object 105. For example, the system computing entity 102 may receive, access, retrieve, and/or the like the second patient dimension code character string from memory 210 where the second patient dimension code character string was stored after being extracted from the claim data object 105. For example, the extracted plurality of code character strings comprises one or more second patient dimension code character strings. In an example embodiment, the claim data object 105 is an electronically-stored UB-04 bill, which comprises a second patient dimension code portion comprising up to three second patient dimension code character strings.

In various embodiments, the second patient dimension code character string is and/or comprises an ICD code describing the patient's reason for visit or reason for initiating the medical encounter. For example, a patient may be experiencing delirium due to a known physiological condition, and as such, may initiate the medical encounter by visiting the healthcare provider entity. A claim data object 105 describing the following medical encounter may then comprise a second patient dimension code character string comprising the ICD code F05 describing delirium due to a known physiological condition. The patient's reason for visit may be understood as a diagnosis of the patient's medical condition in the patient's own opinion or from the patient's own perspective.

Operation 1002 may then follow operation 1001. Operation 1002 comprises generating and submitting a query comprising the second patient dimension code character string to a second patient dimension datastore. For example, the system computing entity 102 generates a query in memory 324 and transmits the query via network interface 326 such that the second patient dimension datastore receives the query. In various embodiments, the query may be a datastore API call comprising the second patient dimension code character string for the second patient dimension datastore. As another example, the system computing entity 102 comprises the second patient dimension datastore and provides a query comprising the second patient dimension code character string to the second patient dimension datastore. As yet another example, a payer computing entity 106 generates and submits a query comprising the second patient dimension code character string such that a system computing entity 102 comprising the second patient dimension datastore receives the query (e.g., via network interface 220, 326).

As previously discussed in context of other dimension datastores, the second patient dimension datastore comprises and/or stores a plurality of second patient dimension reference values (e.g., ICD codes) that describe non-emergent reasons for visit from a patient's perspective. For example, a reason of visit for a mosquito bite may be deemed to be non-emergent, and an ICD code describing a mosquito bite may be stored in the second patient dimension datastore. Specifically, the second patient dimension datastore may store the plurality of second patient dimension reference values in a second patient dimension table. FIG. 16 illustrates an example second patient dimension table 1600. The second patient dimension table 1600 comprises a plurality of second patient dimension reference values 1602 (e.g., ICD codes) and associated descriptions 1604. The second patient dimension datastore may comprise one or more second patient dimension tables 1600, each comprising different second patient dimension references values 1602 (e.g., ICD codes) based at least in part on which reasons for visit are deemed to be emergent by a payer entity. Thus, the generated and submitted query may comprise an identifier of the payer entity associated with the claim data object 105 (e.g., the payer entity responsible for paying the claim and submitting the claim data object 105 for evaluation), such that a second patient dimension table 1600 corresponding to the payer entity may be referenced by the second patient dimension datastore. Second patient dimension reference values 1602 may also be modified using supervised machine learning methods. In various embodiments, the second patient dimension datastore comprises a default second patient dimension table 1600 comprising a plurality of second dimension reference values 1602 describing non-emergent patient reasons for visit and generally used by one or more payer entities.

Operation 1003 may then follow operation 1002. Operation 1003 comprises receiving a query response from the second patient dimension datastore. For example, system computing entity 102 receives the query response via network interface 220. In various embodiments, the query response is a datastore API response based at least in part on the prior datastore API call generated and submitted by the system computing entity 102 to the second patient dimension datastore.

The query response received from the second patient dimension datastore indicates and/or comprises an indication of whether or not the second patient dimension code character string is present in or recognized by the second patient dimension datastore. The second patient dimension code character string may be present in the second patient dimension datastore by comprising an ICD code substantially similar to a second patient dimension reference value 1602, in various embodiments. Returning to the example of a claim data object 105 comprising a second patient dimension code character string comprising the ICD code F05 describing delirium due to known physiological condition as the patient's reason for visit, a received query response may indicate that the second patient dimension code character string is present based at least in part on a second patient dimension table 1600 comprising a second patient dimension reference value 1602 of F05. Thus, in such an example, the query response may thereby indicate that the second patient dimension code character string describes a non-emergent reason for visit. If the second patient dimension table 1600 does not store a reference value substantially similar to the second patient dimension code character string, then the query response may instead indicate that the second patient dimension code character string is not present.

In various embodiments, a second patient dimension table 1600 may comprise a second patient dimension reference value 1602 (e.g., an ICD code) substantially similar to a first patient dimension reference value 1202, a first provider dimension reference value 1302, and/or a third provider dimension reference value 1502. For example, a particular ICD code describing a non-emergent patient reason for visit may also describe a non-emergent external cause or mechanism of patient injury, a non-emergent primary diagnosis, and/or a non-emergent secondary diagnosis or comorbidity. Likewise however, a particular second patient dimension reference value 1602 may be present in one or more other dimension tables (e.g., first patient dimension tables 1200, first provider dimension tables 1300, third provider dimension tables 1500) while being absent in other dimension tables. As such, a particular ICD code may be evaluated differently as a second patient dimension code character string and as another dimension code character string.

Operation 1004 may then follow operation 1003. Operation 1004 comprises determining whether the query response indicates that the second patient dimension code character string is present in the second patient dimension datastore. If the query response indicates that the second patient dimension code character string is present—and thereby describes a non-emergent reason for visit, operation 1007 may be performed. Operation 1007 comprises assigning a second claim classification (e.g., non-emergent) to the claim data object 105. As previously discussed, a second claim classification (e.g., non-emergent) may indicate that the claim data object 105 is non-emergent in nature and/or is emergent to a second degree, level, or magnitude different than a first claim classification (e.g., emergent). In various embodiments, assigning the second claim classification (e.g., non-emergent) to the claim data object 105 comprises assigning a second classification (e.g., non-emergent classification) flag, which may be a data entity comprises a code "NEFAI" and a text string "This ER claim is identified as being Non-emergent."

It may be understood that operation 1007 may be performed such that a second claim classification (e.g., non-emergent) is assigned to the claim data object 105 at the current fifth dimension evaluation level. This is contrasted to the first, second, third, and fourth dimension evaluation levels, where a second claim classification (e.g., non-emergent) is not assigned to the claim data object 105 and each dimension evaluation level instead proceeds to the respectively next dimension evaluation level. However, it will be recognized that the claim data object 105 is evaluated at the current fifth dimension evaluation level as a result of various conditions being satisfied at the first, second, third, and fourth dimension evaluation levels. Thus, a second claim classification (e.g., non-emergent) is assigned to the claim data object 105 after the claim data object 105 is evaluated to be non-emergent with respect to a first patient dimension in the first dimension evaluation level, a first provider dimension in the second dimension evaluation level, a second provider dimension in the third dimension evaluation level, a third provider dimension in the fourth dimension evaluation level, and a second patient dimension in the current fifth dimension evaluation level. Stated otherwise, a second claim classification (e.g., non-emergent) is assigned to the claim data object 105 based at least in part on and after a multi-dimensional non-emergent evaluation of the claim data object 105. Subsequent to operation 1007, the process 1000 may exit, and operation 404 of process 400 may be performed, which comprises performing a classification-based action based at least in part on the generated and now-assigned second claim classification (e.g., non-emergent) of the claim data object 105

On the other hand, operation 1005 may be performed if the query response indicates that the second patient dimension code character string is not present, thereby indicating that the second patient dimension code character string describes a patient's reason for visit that is not deemed to be non-emergent. Operation 1005 comprises assigning a second patient dimension flag to the claim data object 105. For example, the system computing entity 102 assigns the second patient dimension flag to the claim data object 105 by concatenating the second patient dimension flag to the claim data object 105, inserting the second patient dimension flag in the claim data object 105, linking the second patient dimension flag with the claim data object 105, and/or the like. In an example embodiment, the second patient dimension flag is a data entity comprising a code "NEF5I" and a message "The claim has reason for visit code(s) that is considered emergent."

Operation 1006 may then follow operation 1005. Operation 1006 comprises assigning a first claim classification (e.g., emergent) to the claim data object 105. The first claim classification (e.g., emergent) may indicate that the claim data object 105 has been evaluated to be emergent, and/or the claim data object 105 has been evaluated to be emergent to a first degree, level, or magnitude. Subsequently, operation 404 of process 400 may be performed, which comprises performing a classification-based action based at least in part on the generated and now-assigned first claim classification (e.g., emergent) of the claim data object 105.

Thus, it will be understood that the fifth dimension evaluation level is directed to determining the emergent classification of the second patient dimension of the medical encounter, specifically relating to the patient reason for visit in the medical encounter. As such, the perspective and needs of the patient may be considered in determining the classification of the claim data object (e.g., emergent or non-emergent) 105. For example, while a primary diagnosis may not signify a particular emergent medical condition of the patient, the patient may believe that their medical condition is emergent in nature, which is considered here in the fifth dimension evaluation level. For example, the patient may be experiencing severe neck pain which the patient believes to be emergent in nature, but the primary diagnosis may determine that the severe neck pain is due to sleeping position. Rather than assigning a second classification (e.g., non-emergent classification) to the claim data object 105 based at least in part only on the primary diagnosis, the patient's perspective of the patient's emergent needs are considered when assigning a classification to the claim data object 105.

Classification-Based Operations

Returning to FIG. 4, the process 400 may continue to operation 404, which comprises performing a classification-based action based at least in part on the generated claim classification of the claim data object. Operation 404 may follow operation 403 of generating a claim classification for the claim data object 105. For example, operation 404 may be performed following one of: (i) a first claim classification (e.g., emergent) being assigned to the claim data object 105 at the first dimension evaluation level, (ii) a first claim classification (e.g., emergent) being assigned to the claim data object 105 at the second dimension evaluation level, (iii) a first claim classification (e.g., emergent) being assigned to the claim data object 105 at the third dimension evaluation level, (iv) a first claim classification (e.g., emergent) being assigned to the claim data object 105 at the fourth dimension evaluation level, (v) a first claim classification (e.g., emergent) being assigned to the claim data object 105 at the fifth dimension evaluation level, or (vi) a second claim classification (e.g., non-emergent) being assigned to the claim data object 105 at the fifth dimension evaluation level.

The classification-based action performed may also be based at least in part on a dimension flag assigned to the claim data object 105. For a claim data object 105 assigned with a first claim classification (e.g., emergent), a dimension flag may indicate at which dimension evaluation level or with respect to which patient or provider dimension the first claim classification (e.g., emergent) was assigned. For example, a first provider dimension flag indicates that the claim data object 105 to which it is assigned was assigned a first claim classification (e.g., emergent) specifically with respect to the first provider dimension relating to a primary diagnosis by the healthcare provider entity. Therefore, a claim data object 105 assigned with a first provider dimension flag and a claim data object 105 assigned with a second patient dimension flag may have been assigned first claim priorities based at least in part on different evaluations. Thus, the classification-based action may be based at least in part on a dimension flag assigned to the claim data object 105.

The classification-based action comprises providing the assigned claim classification for the claim data object 105. In an example embodiment, the system computing entity 102 generates a claim classification (e.g., a first claim classification (e.g., emergent), a second claim classification (e.g., non-emergent)) for the claim data object 105 and provides the assigned claim classification to the payer computing entity 106. For example, the assigned claim classification is provided in a system API response in response to a system API call transmitted by the payer computing entity 106. For example, the system computing entity 102 transmits a notification comprising an indication of the assigned claim classification over a network via network interface 220 such that the payer computing entity 106 receives the notification comprising the indication of the assigned claim classification. In another example embodiment, the payer computing entity 106 generates a claim classification for the claim data object 105, for example, and provides an indication of the assigned claim classification to the provider computing entity 104. For example, the payer computing entity 106 assigns a second claim classification (e.g., non-emergent) and provides an indication of the second claim classification (e.g., non-emergent) to the provider computing entity 104, thereby also indicating that the payer has deemed the medical encounter to be non-emergent and will not pay for the medical encounter at an emergent level. In various embodiments, an indication of the assigned claim classification is also provided to the patient.

In various embodiments, the classification-based action comprises providing the claim data object 105 for further review, such as by a human operator or user. Providing the claim data object 105 for further review may be based at least in part on a second claim classification (e.g., non-emergent) being assigned to the claim data object 105 (e.g., at the fifth dimension evaluation level). A claim data object 105 may be provided for further review based at least in part on a configuration or setting in the claim data object 105. For example, a claim data object 105 may comprise a "catch and release" tag that may signify that if the claim data object 105 is assigned a second claim classification (e.g., non-emergent), further review is needed. In an example embodiment, the claim data object 105 may be provided for further review with a provided message "ACTION NEEDED—This ER claim is identified as being Non-emergent and may not be covered for member." Further review, such as by a human operator or user, may cause the claim classification of the claim data object 105 to be modified. For example, a second claim classification (e.g., non-emergent) of the claim data object 105 may be changed to a first claim classification (e.g., emergent) if a human operator or user believes that the claim data object 105 and/or the medical encounter is indeed emergent in nature, or emergent to a first degree, level, or magnitude.

In various embodiments, the classification-based action comprises further processing the claim data object 105 and modifying a claim classification of the claim data object 105. Claim data objects assigned with a first claim classification (e.g., emergent) indicating an emergent classification and/or a first emergent degree, level, magnitude, and/or the like may be subjected to further processing to determine additional aspects of the nature of the medical encounter. In various embodiments, the claim data object 105 is further processed to determine whether the medical encounter was avoidable.

An avoidable determination of a claim data object 105 may indicate that the patient could have received the level of care experienced in the medical encounter in a lower cost setting. For example, determining that the medical encounter was avoidable may comprise determining whether various code character strings describe chronic conditions or specific symptom conditions that are common in most emergent medical encounters. Claim data objects that lack such code character strings may represent a "single-circumstance" medical encounter with a low acuity or low urgency profile. An avoidable determination may be based at least in part on a primary diagnosis of the medical encounter as well as Social Determinants of Health (SDOH) risk factors unique to the patient. Determining that the medical encounter was avoidable may comprise modifying the claim classification of the claim data object 105 to a third claim classification and/or assigning a third claim classification to the claim data object 105, and further performing a classification-based action based at least in part on the third claim classification of the claim data object 105. For example, a third claim classification-based action may include educating the patient, triage guidance, and/or care management for the patient.

Additionally or alternatively, the claim data object 105 is further processed to determine whether the medical encounter was preventable. A preventable determination of a claim data object 105 may indicate that the patient required emergent care or that the emergent medical encounter occurred due to delayed intervention. For example, earlier visibility into escalating medical signs and symptoms in the patient may have prevented an emergent medical encounter. Preventable determinations may also be based at least in part on SDOH risk factors unique to the patient. Determining that the medical encounter was preventable may comprise modifying the claim classification of the claim data object 105 to a fourth claim classification and/or assigning a fourth claim classification to the claim data object 105, and further performing a classification-based action based at least in part on the fourth claim classification of the claim data object 105. For example, a fourth claim classification-based action may include generating a patient profile, analyzing a patient profile, categorizing the patient and/or the patient profile into an engagement pathway enabling monitoring of escalating signs and symptoms, triage support, and/or the like.

In various embodiments, the classification-based action performed comprises determining a sub-classification or emergent level for a claim data object 105 assigned with a first claim classification (e.g., emergent). As aforementioned, a first claim classification (e.g., emergent) assigned to a claim data object 105 may indicate that the claim data object 105 is emergent in nature, but two claim data objects 105 each assigned with a first claim classification (e.g., emergent) may not be equally emergent. As such, a sub-classification or an emergent level may be determined for a first claim classification (e.g., emergent) claim data object 105. For example, U.S. Pat. No. 10,417,382 provides an example system for deriving an expected emergency department visit level, the contents of which are incorporated herein by reference in their entirety.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:

receiving, by one or more processors, a multi-dimensional data object having a plurality of values corresponding to a plurality of respective dimensions of a medical encounter;

generating, by the one or more processors and based at least in part on a multi-dimensional evaluation of the plurality of values of the multi-dimensional data object, a classification for the multi-dimensional data object, wherein the multi-dimensional evaluation comprises:

generating and submitting a first query for a first data store of one or more data stores, wherein (1) each data store of the one or more data stores comprises one or more reference code tables, each reference code table of the one or more reference code tables stores a different plurality of code character strings, and (2) the first query (a) comprises a first value of the plurality of values, and (b) is for the first data store to (i) determine whether the first value is present in a first reference code table of the one or more reference code tables of the first data store, and (ii) provide a first response indicating whether the first value is present in the first reference code table of the first data store;

responsive to receiving the first response for the first query indicating that the first value is present in the first reference code table of the first data store, (1) determining a first classification for the first value of the plurality of values that indicates whether the medical encounter is emergent, (2) storing the first classification, and (3) generating and submitting a second query for a second data store of the one or more data stores, wherein the second query (a) comprises a second value of the plurality of values, and (b) is for the second data store to (i) determine whether the second value is present in a second reference code table of the one or more reference code tables of the second data store, and (ii) provide a second response indicating whether the second value is present in the second reference code table of the second data store;

responsive to receiving the second response for the second query indicating that the second value is present in the second reference code table of the second data store, (1) determining a second classification for the second value of the plurality of values that indicates whether the medical encounter is emergent and (2) storing the second classification, wherein the first data store stores first data associated with a first dimension of the plurality of respective dimensions and the second data store stores second data associated with a second dimension of the plurality of respective dimensions that is different from the first dimension; and generating the classification based at least in part on the first classification and the second classification;

storing, by the one or more processors, the classification; and executing, by the one or more processors, a classification-based action based at least in part on the classification, wherein the classification-based action comprises at least one of (i) generating and providing a notification comprising an indication of the classification, (ii) providing the multi-dimensional data object to a user for further evaluation, (iii) further processing the multi-dimensional data object to determine a sub-classification, or (iv) modifying the classification.

2. The computer-implemented method of claim 1, wherein the multi-dimensional data object is received via a system application programming interface (API) call and the classification-based action comprises providing the classification via a system API response.

3. A system comprising one or more processors and at least one memory storing processor executable instructions that, when executed by the one or more processors, cause, the one or more processors to perform operations comprising:

receiving a multi-dimensional data object having a plurality of values corresponding to a plurality of respective dimensions of a medical encounter;

generating, based at least in part on a multi-dimensional evaluation of the plurality of values of the multi-dimensional data object, a classification for the multi-dimensional data object, wherein the multi-dimensional evaluation comprises:

generating and submitting a first query for a first data store of one or more data stores, wherein (1) each data store of the one or more data stores comprises one or more reference code tables, each reference code table of the one or more reference code tables stores a different plurality of code character strings, and (2) the first query (a) comprises a first value of the plurality of values, and (b) is for the first data store to (i) determine whether the first value is present in a first reference code table of the one or more reference code tables of the first data store, and (ii) provide a first response indicating whether the first value is present in the first reference code table of the first data store;

responsive to receiving the first response for the first query indicating that the first value is present in the first reference code table of the first data store, (1) determining a first classification for the first value of the plurality of values that indicates whether the medical encounter is emergent, (2) storing the first classification, and (3) generating and submitting a second query for a second data store of the one or more data stores, wherein the second query (a) comprises a second value of the plurality of values, and (b) is for the second data store to (i) determine whether the second value is present in a second reference code table of the one or more reference code tables of the second data store, and (ii) provide a second response indicating whether the second value is present in the second reference code table of the second data store;

responsive to receiving the second response for the second query indicating that the second value is present in the second reference code table of the second data store, (1) determining a second classification for the second value of the plurality of values that indicates whether the medical encounter is emergent and (2) storing the second classification, wherein—the first data store stores first data associated with a first dimension of the plurality of respective dimensions and the second data store stores second data associated with a second dimension of the plurality of respective dimensions that is different from the first dimension; and generating the classification based at least in part on the first classification and the second classification;

storing the classification; and executing a classification-based action based at least in part on the classification, wherein the classification-based action comprises at least one of (i) generating and providing a notification comprising an indication of the classification, (ii) providing the multi-dimensional data object to a user for further evaluation, (iii) further processing the multi-dimensional data object to determine a sub-classification, or (iv) modifying the classification.

4. The system of claim 3, wherein the classification is one of emergent or non-emergent.

5. The system of claim 3, wherein the operations further comprise:

responsive to determining that the classification is emergent, excluding the multi-dimensional data object from further processing.

6. The system of claim 3, wherein the operations further comprise:

responsive to determining that the classification is non-emergent, assigning a catch and release tag to the multi-dimensional data object.

7. The system of claim 3, wherein the operations further comprise:

generating, based on the classification, a dimension flag; and concatenating the dimension flag to the multi-dimensional data object.

8. The system of claim 3, wherein the multi-dimensional data object is received via a system application programming interface (API) call and the classification-based action comprises providing the classification via a system API response.

9. One or more non-transitory computer-readable storage media including instructions that configure one or more processors to perform operations comprising:

receiving a multi-dimensional data object having a plurality of values corresponding to a plurality of respective dimensions of a medical encounter;

generating, based at least in part on a multi-dimensional evaluation of the plurality of values of the multi-dimensional data object, a classification for the multi-dimensional data object, wherein the multi-dimensional evaluation comprises:

generating and submitting a first query for a first data store of one or more data stores, wherein (1) each data store of the one or more data stores comprises one or more reference code tables, each reference code table of the one or more reference code tables stores a different plurality of code character strings, and (2) the first query (a) comprises a first value of the plurality of values, and (b) is for the first data store to (i) determine whether the first value is present in a first reference code table of the one or more reference code tables of the first data store, and (ii) provide a first response indicating whether the first value is present in the first reference code table of the first data store;

responsive to receiving the first response for the first query indicating that the first value is present in the first reference code table of the first data store, (1) determining a first classification for the first value of the plurality of values that indicates whether the medical encounter is emergent, (2) storing the first classification, and (3) generating and submitting a second query for a second data store of the one or more data stores, wherein the second query (a) comprises a second value of the plurality of values, and (b) is for the second data store to (i) determine whether the second value is present in a second reference code table of the one or more reference code tables of the second data store, and (ii) provide a second response indicating whether the second value is present in the second reference code table of the second data store;

responsive to receiving the second response for the second query indicating that the second value is present in the second reference code table of the second data store, (1) determining a second classification for the second value of the plurality of values that indicates whether the medical encounter is emergent and (2) storing the second classification, wherein the first data store stores first data associated with a first dimension of the plurality of respective dimensions and the second data store stores second data associated with a second dimension of the plurality of respective dimensions that is different from the first dimension; and generating the classification based at least in part on the first classification and the second classification;

storing the classification; and executing a classification-based action based at least in part on the classification, wherein the classification-based action comprises at least one of (i) generating and providing a notification comprising an indication of the classification, (ii) providing the multi-dimensional data object to a user for further evaluation, (iii) further processing the multi-dimensional data object to determine a sub-classification, or (iv) modifying the classification.

10. The computer-implemented method of claim 1, wherein the plurality of values comprises a plurality of code portions.

11. The computer-implemented method of claim 10, wherein one or more code portions of the plurality of code portions corresponds to a respective dimension of the plurality of respective dimensions.

12. The computer-implemented method of claim 11, wherein the one or more code portions of the plurality of code portions comprise one or more character strings.

13. The computer-implemented method of claim 1, wherein the classification is one of emergent or non-emergent.

14. The computer-implemented method of claim 13, wherein, in an instance where the classification is emergent, the classification further includes one or more of a degree, level, or magnitude.

15. The computer-implemented method of claim 1, further comprising:

generating, based on the classification, a dimension flag; and concatenating the dimension flag to the multi-dimensional data object.

16. The computer-implemented method of claim 1, further comprising:

responsive to determining that the classification is emergent, excluding the multi-dimensional data object from further processing.

17. The computer-implemented method of claim 1, further comprising:

responsive to determining that the classification is non-emergent, assigning a catch and release tag to the multi-dimensional data object.

18. The one or more non-transitory computer-readable storage media of claim 9, wherein the classification is one of emergent or non-emergent.

19. The one or more non-transitory computer-readable storage media of claim 9, wherein the operations further comprise:

responsive to determining that the classification is emergent, excluding the multi-dimensional data object from further processing.

20. The one or more non-transitory computer-readable storage media of claim 9, wherein the operations further comprise:

responsive to determining that the classification is non-emergent, assigning a catch and release tag to the multi-dimensional data object.

* * * * *

UNITED STATES PATENT AND TRADEMARK OFFICE

CERTIFICATE OF CORRECTION

PATENT NO. : 12,386,860 B1
APPLICATION NO. : 17/511370
DATED : August 12, 2025
INVENTOR(S) : Lisa Dianne Rose et al.

It is certified that error appears in the above-identified patent and that said Letters Patent is hereby corrected as shown below:

In the Claims

In Column 49, Line 49, Claim 3, delete “processors, cause,” and insert -- processors, cause --, therefor.

In Column 50, Line 32, Claim 3, delete “wherein—the first” and insert -- wherein the first --, therefor.

Signed and Sealed this
Eighteenth Day of November, 2025

John A. Squires
*Director of the United States Patent and Trademark Office*